United States Patent
Takayanagi et al.

(10) Patent No.: US 7,201,403 B2
(45) Date of Patent: Apr. 10, 2007

(54) QUICK CONNECTOR

(75) Inventors: Akira Takayanagi, Aichi-ken (JP); Hiroyoshi Mori, Aichi-ken (JP); Motohide Nishimura, Gifu-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/997,260

(22) Filed: Nov. 24, 2004

(65) Prior Publication Data
US 2005/0153593 A1  Jul. 14, 2005

(30) Foreign Application Priority Data
Nov. 28, 2003 (JP) .............................. 2003-400920
Nov. 19, 2004 (JP) .............................. 2004-336774

(51) Int. Cl.
*F16L 39/00* (2006.01)
(52) U.S. Cl. ...................................... 285/321; 285/305
(58) Field of Classification Search ................ 285/321, 285/305
See application file for complete search history.

(56) References Cited

U.S. PATENT DOCUMENTS

| 4,884,829 A | 12/1989 | Funk et al. |
| 5,513,882 A | 5/1996 | Lewis |
| 5,855,399 A * | 1/1999 | Profunser ................... 285/305 |

FOREIGN PATENT DOCUMENTS

| DE | 19603506 | 6/1997 |
| EP | 1143187 | 10/2001 |
| FR | 2357647 | 2/1978 |
| FR | 2855590 A | 12/2004 |
| GB | 1 370 784 | 10/1974 |
| GB | 2 087 021 | 5/1982 |
| GB | 2 302 926 | 5/1997 |
| JP | 2003-21287 | 7/2001 |

OTHER PUBLICATIONS

UK Patent Office Examination Report dated Sep. 12, 1996.
European Patent Office Examination Report dated Apr. 8, 2005.
French Patent Office Examination Report dated Mar. 13, 2006.
Chinese Patent Office Examination Report dated Dec. 2, 2005.

* cited by examiner

*Primary Examiner*—Aaron Dunwoody
(74) *Attorney, Agent, or Firm*—Andrus, Sceales, Starke & Sawall, LLP

(57) ABSTRACT

A first quick connector is provided with a connector housing and a wire retainer. The connector housing has a retainer mounting portion which is formed with engagement slits. The wire retainer is mounted on the retainer mounting portion such that engagement arms enter the engagement slits and project in the retainer mounting portion. Each of the engagement slits has a first slit part on one circumferential end and a second slit part on the other circumferential end with intervening a divider portion therebetween.

5 Claims, 17 Drawing Sheets

QUICK CONNECTOR

BACKGROUND OF THE INVENTION

1. Field of the Invention

The present invention relates to a quick connector, for example, to be adapted for assembly in piping of an automobile.

2. Description of the Related Art

In a fluid piping system where a pipe and a hose are joined, a connector is used for joining a pipe and a hose. In such piping system, a connector has a tubular connector housing including a connecting portion on one axial end to be connected to a hose. And, for example, a pipe includes an inserting end portion on an inserting end thereof wherein an annular engagement projection is formed on and around an outer peripheral surface, retainer means is provided on an opposite axial end of the connector housing for snap-engagement, and thereby the connector is configured as quick connection type. Then, the inserting end portion of the pipe is inserted into an opening on an end of the connector housing so that the annular engagement projection snap-engages with the retainer means to provide locking relation between the pipe and the connector, thereby connection of the pipe and the connector is completed. In retainer means to be adapted for a connector of quick connecting type, namely a quick connector, such wire retainer (for example, a retainer formed from wire member) is often used as to be of horseshoe shape or generally horseshoe shape and have a pair of engagement arms. Here, a pair of engagement slits are formed in a connector housing on an opposite axial end in diametrically opposed relation, and the wire retainer is mounted on an opposite axial end of the connector housing or an outer periphery of the connector housing on an opposite axial end so that a pair of the engagement arms seat in the engagement slits so as to clip the connector housing (for example, refer to Patent Document 1). Application of such retainer means secures sufficient stability in mounting of retainer to a connector housing even if a connector is sized relatively large in diameter.

1. JP, A, 2003-21287 (specifically, FIG. 2)

By the way, in order that engagement arms of a wire retainer project in the connector housing enough to engage with an annular engagement projection of a pipe over long range and firmly stop an escape movement of the pipe, each engagement slit should have a circumferential length from one circumferential end to the other circumferential end relatively large, for example, of about a quarter of a circle. However, typically, the connector housing is formed with relatively thin-wall in view of weight saving or the like. If such connector housing is provided with two engagement slits, each of which extends continuously as long as a quarter of a circle, there is a fear that a strength of the connector housing is degraded. Specifically, if the connector housing is made of metal and is adapted for internal fluid of extremely high temperature, a problem of strength degradation of the connector housing should be considered as not negligible.

Accordingly, it is an object of the present invention to provide a quick connector with sufficient strength although a connector housing is provided with engagement slits on an opposite axial end thereof which allow engagement arms of a wire retainer to project long or deep inside of the connector housing.

SUMMARY OF THE INVENTION

In order to achieve a foregoing object, there is provided a novel quick connector with a wire retainer for joining a pipe and a hose. The quick connector has a tubular connector housing. The connector housing is provided with a connecting portion to be connected with a hose (namely a mating member to be joined to a pipe) on one axial end thereof (namely on an end or a side in one direction of an axis of the quick connector or the connector housing), and a pair of engagement slits in diametrically opposed relation on an opposite axial end thereof (namely on an end or a side in an opposite direction of an axis of the quick connector or the connector housing). The quick connector also has a wire retainer of horseshoe shape or generally horseshoe shape. The wire retainer is provided with a pair of engagement arms and fitted to or on or mounted to or on an outer peripheral surface of the connector housing on an opposite axial end thereof so that a pair of the engagement arms seat in the engagement slits so as to clip or embrace the connector housing. The engagement arms of the wire retainer are configured to project through the engagement slits into the connector housing and to snap-engage with an annular engagement projection formed on the inserting end portion of the pipe when the inserting end portion is inserted in or into the connector housing. Each of the engagement slits is formed with width generally equal to or slightly larger than a diameter of the engagement arm of the wire retainer, and has a first slit part on one circumferential end and a second slit part on the other circumferential end. The first slit part and the second slit part are discontinued. A circumferential length or distance of the engagement slit, between one and the other circumferential ends thereof, namely from one circumferential end of the first slit part to the other circumferential end of the second slit part may be designed long, for example, generally equal to a quarter of a circle, or slightly shorter than a quarter of a circle. The first slit part and the second slit part are formed to be spaced circumferentially by or with a distance, for example, a small distance. The distance or a divider portion defined between the first and the second slit parts is preferably sized as small as possible, to the extent that strength of the connector housing is prevented from being unacceptable due to the engagement slits formed therein. When the distance or divider portion is sized small, there is a little possibility to adversely affect situating of the engagement arms of the wire retainer in the engagement slits. So, the divider portion which is interposed between the first and the second slit parts may be have a narrow or small circumferential length or width, for example, generally equal to the width (axial width) of the engagement slit. Thus configured divider portion also effectively prevents that the engagement arms are deformed radially outwardly due to external factors and escape from the engagement slits.

In many cases, the wire retainer is fitted to or mounted to the connector housing movably up and down between a fit-on position, mounted position or mounting position and a retracted position. In the mounted position, a pair of the engagement arms may engage with the annular engagement projection of the pipe, and in the retracted position, a pair of the engagement arms allow the annular engagement projection to pass through therebetween. Here, the wire retainer is typically moved from the mounted position to the retracted position by pulling the wire retainer in a pull out direction. For example, the pipe is inserted in the quick connector wherein the wire retainer is retained in the mounted position. The pipe is detached from the quick connector when the wire retainer is pulled out to the retracted position. Therefore, it is required to provide the quick connector with restraining means so as to maintain the wire retainer in the mounted position and not to allow the wire retainer to move or be displaced out of the retracted position in a pull out direction. For example, one of such restraining means is disclosed in the Patent Document 1. In technique of the Patent Document 1, leading ends or free ends of engagement arms of a wire retainer are bent or curved in an axial direction to define engagement portions, while a connector housing is provided or ensured with restraining portions (recessed portion 40, a portion of recessed portion 41) to maintain the engagement portions therein or to restrain movement of the engagement portions. However, when the wire retainer is formed to have the engagement portions extending axially and the connector housing is formed or ensured with restraining portions to be engaged with the engagement portions, this might result in a retainer mounting portion of the connector housing extending improperly long in an axial direction, restraining portions being configured with insufficient restraining function, or any other inconvenience. And so, in the present invention, the engagement slit is provided with the divider portion, the engagement arm engages with the divider portion, and thereby movement of the wire retainer is blocked (restrained) in a pull out direction. For example, the quick connector is configured such that when the wire retainer is moved in a pull out direction, leading ends of the engagement arms slide along an outer peripheral surface of the connector housing. And, as a result, the engagement arms spread apart and then the engagement arms spreading apart engage with the divider portions. In some cases, the engagement arms, for example, simply abut-engage with the divider portions in a pull out direction. Or in some cases, the engagement arms engage with the divider portions in a pull out direction, for example, while tightly caught between the connector housing and the divider portions, respectively. Here, may be applied such technique for maintaining the wire retainer in the mounted position that leading ends of the engagement arms are curved or bent radially inwardly so as to engage in a pull out direction with the connector housing, for example, a portion of an outer surface of the connector housing beyond a center thereof in the mounting direction of the wire retainer. This technique, for example, may eliminate necessity to provide the wire retainer with engagement portions projecting axially while to provide or ensure the connector housing with restraining portions to be engaged with the engagement portions projecting axially.

The wire retainer may be configured to engage or engage in a mounting direction with circumferential end portion or circumferential end or edge of the engagement slits when moved in the retracted position. This permits to maintain the wire retainer in the retracted position with simple configuration of the quick connector.

Meanwhile, as the case may be, in view of safety, a leading portion of the engagement arm is preferably curved or bent so as to extend or to be directed in an axial direction (including generally an axial direction). However, an axial portion which is defined on the leading portion of the engagement arm does not allow the engagement arm to enter the engagement slit including the divider portion, and make it difficult to fit or mount the wire retainer to the connector housing. So, in one aspect of the present invention, each of the first and the second slit parts is formed continuously with an opening or an in-and-out opening which allows the axial portion of the engagement arm to slip in and out of the connector housing. For example, the first slit part is formed with the opening on one circumferential end portion thereof and the second slit part is formed with the opening on the other circumferential end portion thereof. The opening may be formed, for example, in a slit so as to extend in an axial direction. In some cases, the opening may be adapted, for example, mainly for incoming opening or only for incoming opening. Or in some cases, the opening may be adapted, for example, mainly for outgoing opening or only for outgoing opening. And, the opening (for example, adapted mainly for outgoing opening) is preferably closed up by a bush fitted in the connector housing after the wire retainer is mounted to the connector housing, in order that the engagement arms are not allowed to escape when manipulating the wire retainer. The axial portion (including generally axial portion) may rise slightly from the outer peripheral surface of the connector housing.

In order to enhance stable connection between a quick connector and a pipe, preferably a wire retainer is configured such that a pair of engagement arms never turn into such a state as to allow the annular engagement projection of the pipe to pass through therebetween, namely do not readily spread apart, by further pushing the wire retainer, for example, exerting a force on the wire retainer in a mounting direction when the wire retainer moves to a mounted position. A wire retainer typically has an operating portion (for example, a fingerhold portion), a pair of shoulders formed on opposite ends thereof and a pair of engagement arms which are formed continuously from the shoulders respectively. And the shoulders may be curved or bent at such a gentle angle as to follow an outer periphery of the connector housing and portions of the shoulders toward the operating portion may rise slightly from the outer periphery of the connector housing when the wire retainer is mounted on the connector housing. In such configuration, if a force is exerted on the operating portion in a mounting direction of the wire retainer due to some reason, the portions of the shoulders toward the operating portion are pushed by the operating portion and may be deformed toward the connector housing. As a result, there is a considerable fear that the engagement arms spread apart largely by acting as lever on fulcrums which are contact parts between the portions of the shoulders toward the engagement arms and the connector housing. The quick connector which is configured as described above prevents such inconvenience. Also, a quick connector, which is offered to prevent such inconvenience, may comprise a tubular connector housing provided with a connecting portion to be connected with a hose on one axial end thereof and a pair of engagement slits in diametrically opposed relation on an opposite axial end thereof, a wire retainer of horseshoe shape or generally horseshoe shape including an operating portion, a pair of shoulders formed on opposite ends of the operating portion having stopper portions to engage or abut with locking parts of the connector housing, and a pair of engagement arms formed on the shoulders. The wire retainer is located in the mounted position from a predetermined radial side and is mounted on an opposite axial end of the connector housing so that a pair of the engagement arms seat in the engagement slits so as to clip or embrace the connector housing. The engagement arms of the wire retainer are configured so as to project through the engagement slits into the connector housing and to snap-engage with the annular engagement projection formed on the inserting end portion of the pipe when the inserting end portion is inserted in or into the connector housing. The stopper portions engage or abut with the locking parts so as not to permit the wire retainer to move in a mounting direction and not to permit the engagement arms spread apart when a force is exerted on the wire retainer in the mounting direction. More effectively, the stopper portions may be bent or curved from the operating portion (for example, in horseshoe shape) laterally outwardly so as to define inwardly curved rises. And, the locking parts may be formed perpendicular to or generally perpendicular to a mounting direction of the wire retainer. And, the locking parts may include locking surfaces perpendicular to or generally perpendicular to the mounting direction of the wire retainer and to engage or abut with the stopper portions, respectively. The stopper portions may be formed along or so as to generally follow the locking surfaces respectively. Thus configured quick connector effectively prevent such accident that the pipe escapes the quick connector.

As described above, according to the present invention, there is provided a novel quick connector having sufficient strength wherein a wire retainer include engagement arms largely projecting inwardly so as to block escape of a pipe.

Now, the preferred embodiments of the present invention will be described in detail with reference to the drawings.

BRIEF DESCRIPTION OF THE DRAWINGS

FIG. 12(*b*) is a view to explain an operating manner of the fourth wire retainer with respect to the fourth quick connector, and showing a state that engaging stopper portions of the fourth wire retainer seat in second slit parts.

DETAILED DESCRIPTION OF THE PREFERRED EMBODIMENTS

Figure 1:
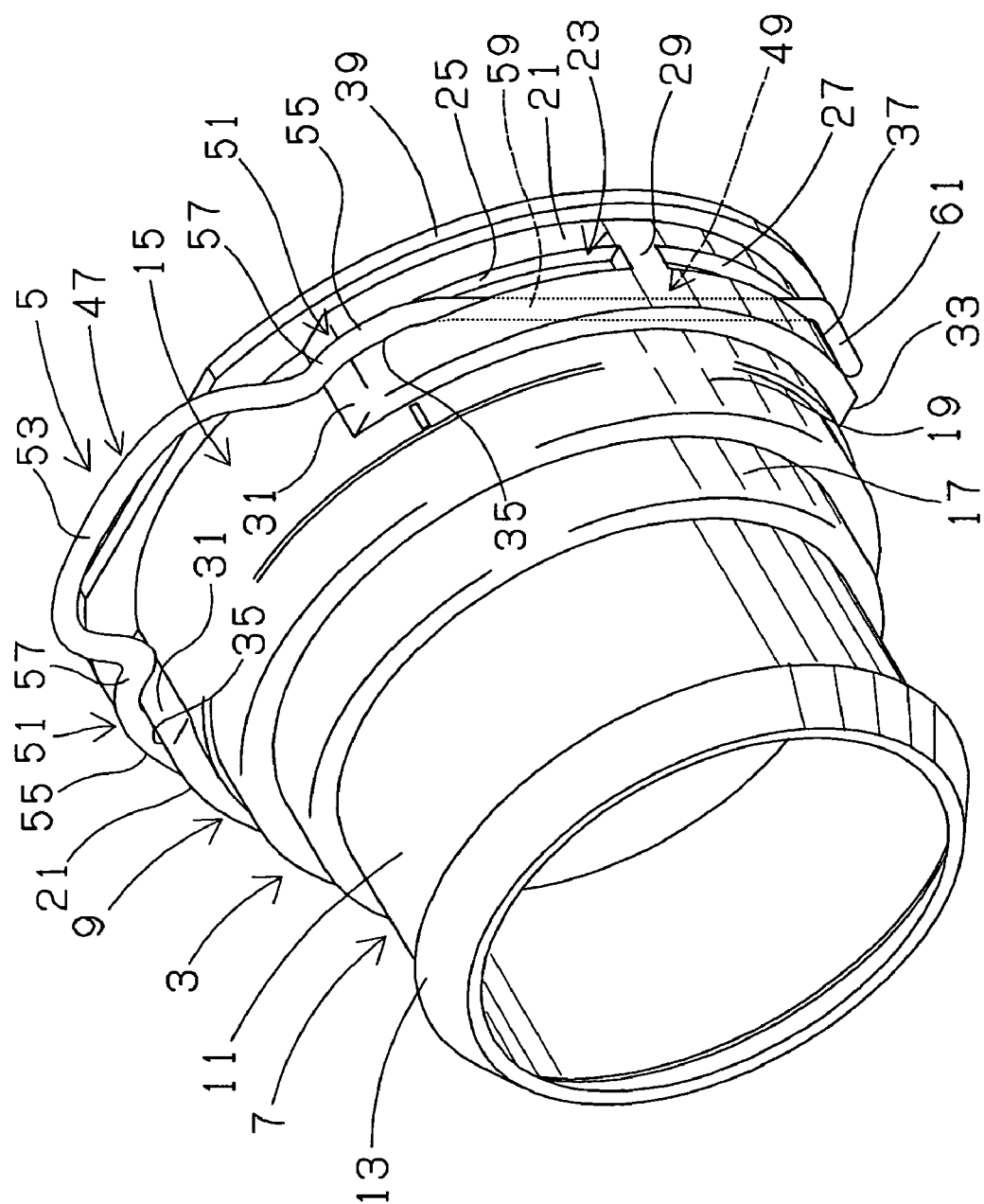
FIG. 1 is a perspective view of a first quick connector according to the present invention.
Figure 2:
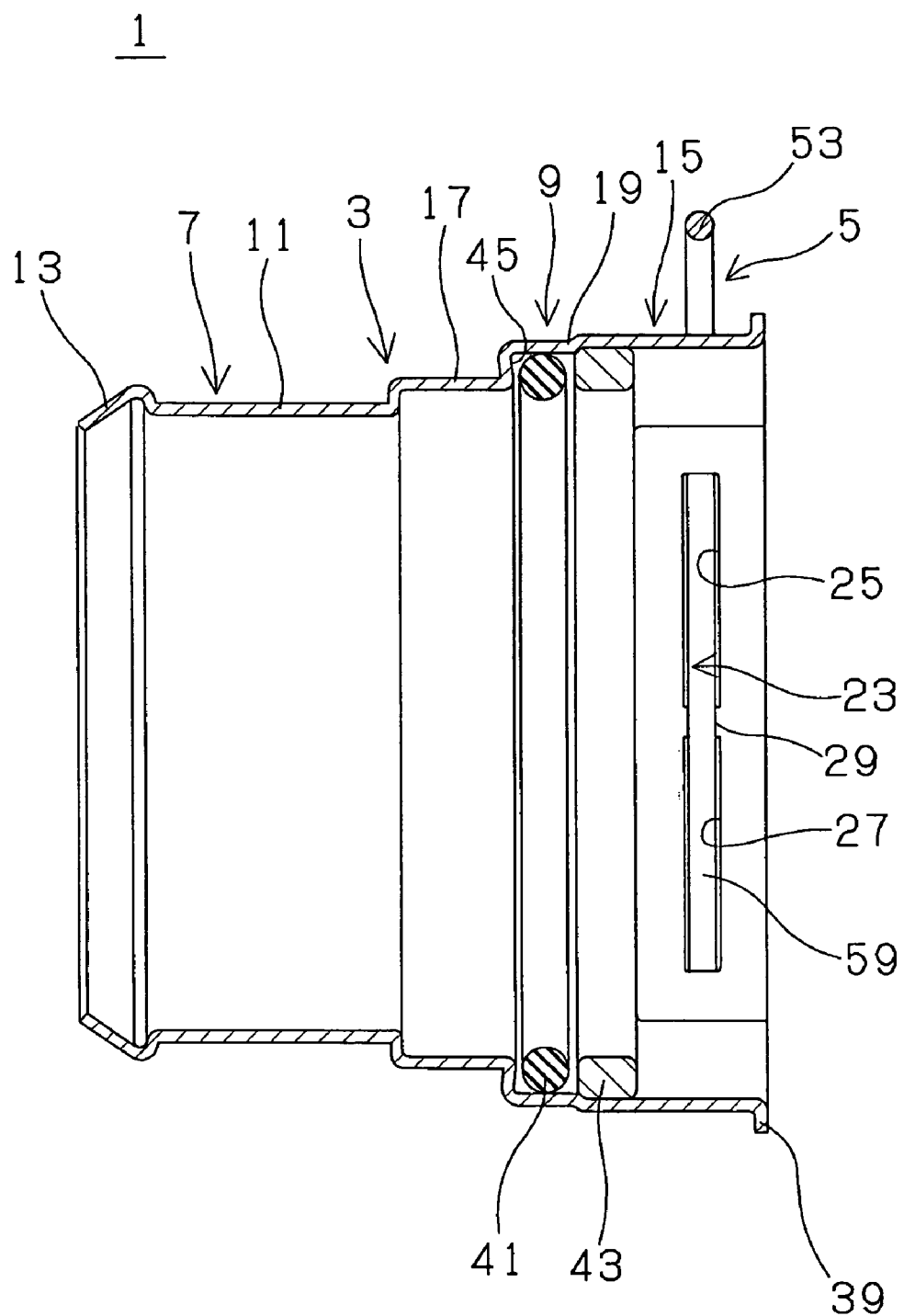
FIG. 2 is a sectional view of the first quick connector.
Figure 3:
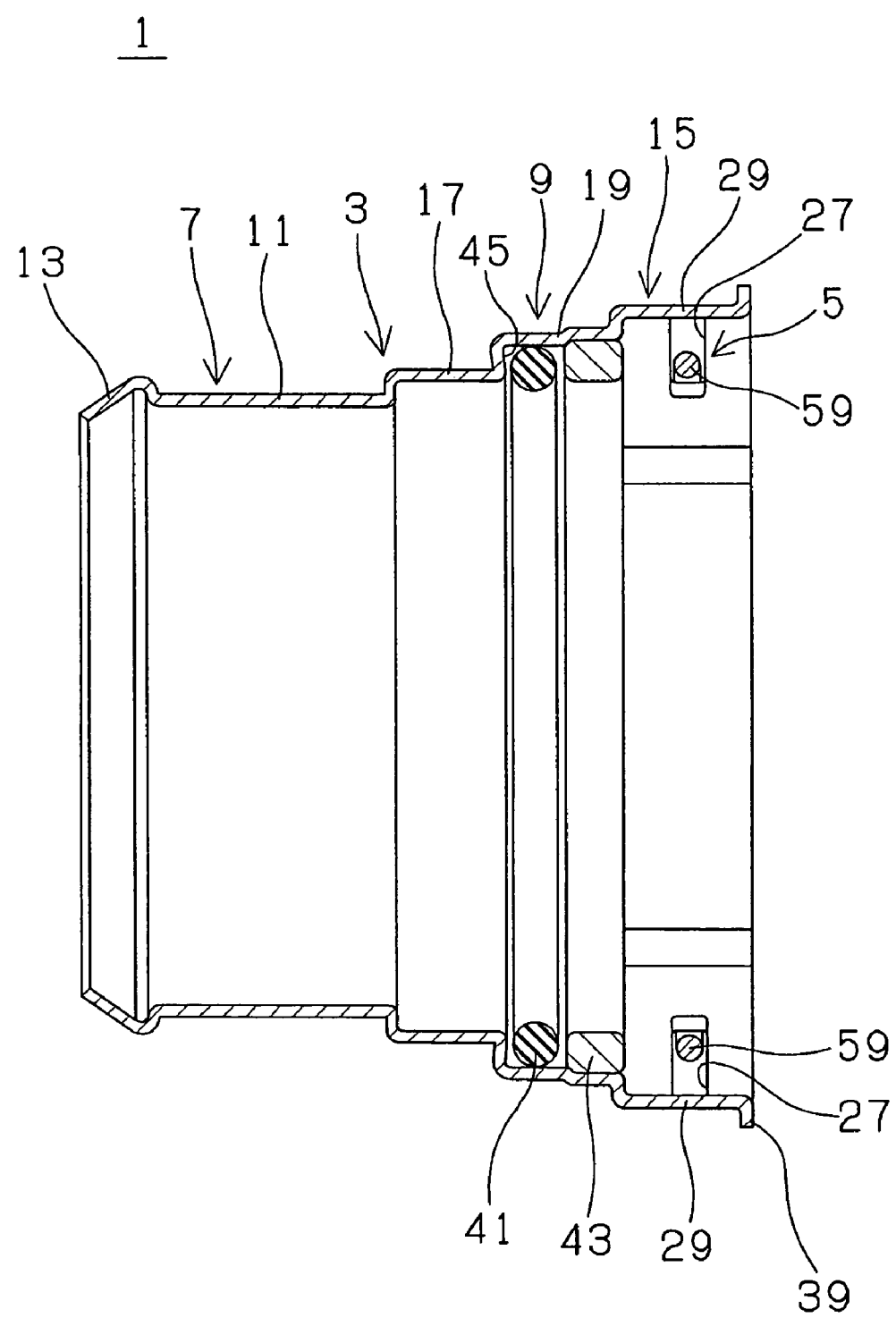
FIG. 3 is another sectional view of the first quick connector.

A first quick connector 1 is adapted, for example, for assembly in air supply and exhaust piping of an automobile. As well understood specifically from FIGS. 1 to 3, the first quick connector 1 comprises a first tubular connector housing 3 which is thin-walled, a wire retainer 5 of horseshoe shape or generally of horseshoe shape mounted on the first connector housing 3. The first connector housing 3, for example, made of metal, has a cylindrical hose connecting portion 7 (connecting portion) on one axial end of the first connector housing 3 (namely on a side in one direction of an axis thereof) and a generally cylindrical pipe inserting portion 9 on an opposite axial end of the first connector housing 3 (namely on a side in an opposite direction of an axis thereof) as a unit. The first connector housing 3 is formed large in diameter and relatively short in axial length to join a hose of large diameter and a pipe of large diameter.

The hose connecting portion 7 includes a cylindrical connecting body 11 and a hose stopper portion 13 formed integrally on one axial end of the connecting body 11. The hose stopper portion 13 is formed in curved manner so as to diametrically enlarge from one axial end thereof toward an opposite direction and protrude radially outwardly from the connecting body 11. Also, the hose stopper portion 13 is formed small in diameter on one axial end, for example, smaller in diameter than the connecting body 11.

The pipe inserting portion 9 includes a retainer mounting portion 15 on an opposite axial end thereof, a pipe retaining portion 17 on one axial end thereof in connected relation with the hose connecting portion 7 and a seal holding portion 19 located on axially intermediate portion between the retainer mounting portion 15 and the pipe retaining portion 17. The pipe retaining portion 17 is formed smaller in diameter than the seal holding portion 19, and larger in diameter than the connecting body 11 of the hose connecting portion 7.

The annular retainer mounting portion 15 of the pipe inserting portion 9 has the same diameter as the seal holding portion 19, more specifically, as an opposite axial end of the seal holding portion 19. The annular retainer mounting portion 15 includes a pair of raised mounting portions (rising portions) 21, 21 having radially outer walls in diametrically symmetrical positions. The radially outer wall of the raised mounting portion 21 is thin and shaped like a part of cylindrical wall. A pair of the raised mounting portions 21, 21 are formed respectively so as to extend for about a quarter of a circle (about one-fourth of the entire circumferential length of the annular retainer mounting portion 15). Or in some cases, the raised mounting portion 21 may be formed so as to extend an entire circle (the entire circumference of the annular retainer mounting portion 15). Each of the raised mounting portions 21, 21 is provided with an engagement slit 23 on the radially outer wall. The engagement slit 23 includes a first slit part 25 on one circumferential end and a second slit part 27 on the other circumferential end of the raised mounting portion 21. The first and the second slit parts 25, 27 are identical or symmetrical in shape with one another. The first and the second slit parts 25, 27 are arranged so as to leave a portion 29 (divider portion) therebetween. The divider portion 29 has a circumferential length generally equal to a width of the engagement slit 23, or slightly longer than the width of the engagement slit 23, for example, about twice the width of the engagement slit 23. That is, the engagement slit 23 is divided into the first slit part 25 and the second slit part 27 by the divider portion 29 which is located, for example, in a circumferential center thereof. And, a width (width in an axial direction of the first quick connector 1) of the raised mounting portion 21 is designed with length about three times, or three to four times the width (width in an axial direction of the first quick connector 1) of the engagement slit 23.

The raised mounting portion 21 includes a first end wall 31 on one circumferential end and a second end wall 33 on the other circumferential end thereof. The first and the second end walls 31, 33 are formed so as to expand parallel to a straight line connecting one and the other divider portions 29, 29 and a central axis, namely parallel to a direction perpendicular to a mounting direction of the first wire retainer 5. A circumferential distance with length about twice the width of the engagement slit 23 is created each between the first end wall 31 and one circumferential end of the first slit part 25, and between the second end wall 33 and the other circumferential end of the second slit part 27 on the raised mounting portion 21. That is why on one circumferential end portion and the other circumferential end portion of the raised mounting portion 21, stop wall regions 35, 37 are defined, respectively. The stop wall regions 35, 37 have circumferential length twice the width of the engagement slit 23.

The retainer mounting portion 15 (or the pipe inserting portion 9 or the first connector housing 3) is formed integrally with an outwardly directed flange 39 protruding radially outwardly on an opposite axial end thereof. The outwardly directed flange 39 is formed integrally on an opposite axial end (or edge) of the raised mounting portion 21. The outwardly directed flange 39 has an circular outer rim except at portions corresponding to between a pair of the raised mounting portions 21, 21. The outer rim of the outwardly directed flange 39 is formed straight at those portions corresponding to between the raised mounting portions 21, 21, as if cut out straight at outer side portions thereof.

In an inner peripheral surface of the seal holding portion 19, an O-ring 41 made of rubber is fitted on one axial end, while a first bush 43, for example, made of metal is press-fitted on an opposite axial end thereof. The first bush 43 is formed in a simple short cylindrical annular shape or in a simple short cylindrical shape. The O-ring 41 is axially retained by and in between the first bush 43 and a stepped portion 45 formed on one axial end of the seal holding portion 19. The seal holding portion 19 has a slightly larger diameter on an opposite axial end than on one axial end thereof.

Figure 5:
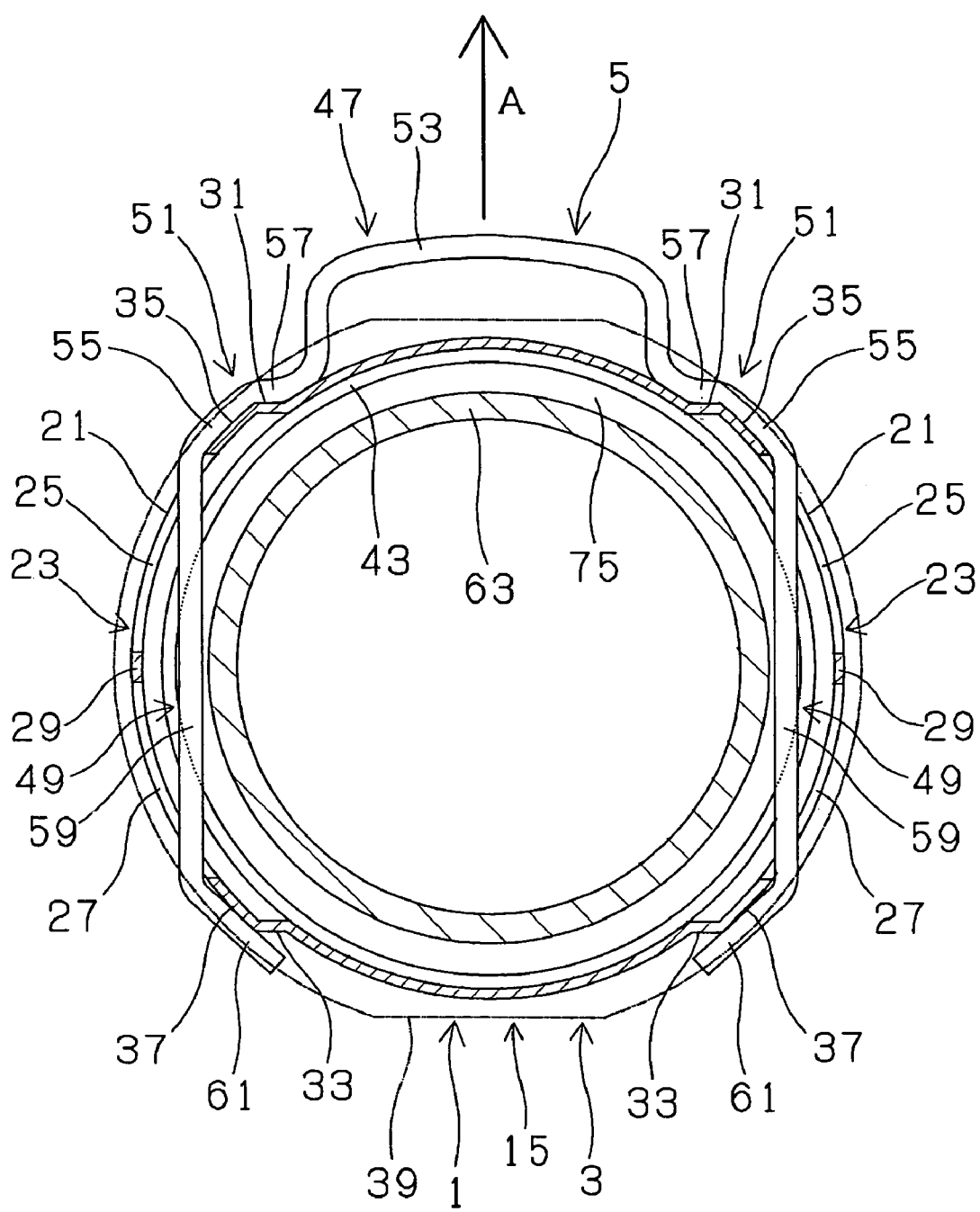
FIG. 5 is a sectional view taken in a radial direction, showing the first quick connector to which the pipe is connected.

Specifically as shown in FIG. 5, the first wire retainer 5 is formed, for example, from a metal wire or wire member bent into a form so as to have a link portion 47 and a pair of engagement arms 49, 49 which extend from opposite ends (widthwise opposite sides or widthwise opposite ends) of the link portion 47 in parallel relation with one another, respectively. The link portion 47 includes shoulders 51, 51 on opposite ends thereof, and a fingerhold portion 53 (operating portion) of horseshoe shape, raised outwardly between the shoulders 51, 51. Each of the shoulders 51, 51 has a shoulder body 55 on an end of the engagement arm 49 to make the engagement arms 49, 49 easier to spread apart, and a stopper portion 57 on an end of the fingerhold portion 53. Each of the stopper portions 57, 57 is formed so as to curve in arcuate shape and in inwardly risen shape from a widthwise end or end portion of the fingerhold portion 53 and extend until oriented laterally outwardly, namely, oriented outwardly, and simultaneously generally perpendicular to an extending direction of the engagement arm 49 or to a mounting direction of the first wire retainer 5. The shoulder body 55 is ramped so as to correspond the stop wall region 35 on one circumferential end, and has a length equal to or generally equal to the stop wall region 35.

Each of the engagement arms 49, 49 has a long arm body 59 which extends straight from a leading end (an end opposite to the fingerhold portion 53) of the shoulder 51 or the shoulder body 55, and an engaging stopper portion 61 formed in curved manner on a leading end (free end) of the arm body 59. The engaging stopper portion 61 is bent inwardly so as to correspond the stop wall region 37 on the other circumferential end, and is somewhat longer than the stop wall region 37. The arm body 59 has a length generally equal to the engagement slit 23, namely, equal to a distance between one circumferential end of the first slit part 25 and the other circumferential end of the second slit part 27. A distance between the arm bodies 59, 59 is designed generally equal to an inner diameter of the pipe retaining portion 17 or the fist bush 43, or an outer diameter of the pipe 63 (refer to FIGS. 4 and 5).

The first wire retainer 5 is located in a mounted position from a side of the first slit 25 (predetermined radial side). As well shown in FIGS. 5 and 6, the first wire retainer 5 is mounted on an outer peripheral surface of the retainer mounting portion 15 of the first quick connector 1 by inserting the engagement arms 49, 49 into the first slit parts 25, 25 from a side of the engaging stopper portion 61 in the following manner. Here, the shoulder bodies 55, 55 contact the stop wall regions 35, 35 on one circumferential end of the raised mounting portions 21, 21 respectively, along or so as to follow outer surfaces of the stop wall regions 35, 35. The stopper portions 57, 57 abut the first end walls 31, 31 of the raised mounting portions 21, 21 respectively, while the engaging stopper portions 61, 61 contact and engage with the stop wall regions 37, 37 of the other circumferential end of the raised mounting portions 21, 21 respectively, along or so as to follow outer surfaces of the stop wall regions 37, 37. In order to engage the engaging stopper portions 61, 61 with the stop wall regions 37, 37, insertion of the engagement arms 49, 49 is suspended, for example, when the engaging stopper portions 61, 61 come adjacent to the other circumferential end or edge of the second slit parts 27, 27, and is resumed after resiliently deformed outwardly the engaging stopper portions 61, 61, for example, so as to locate the leading ends (free ends) of the engaging stopper portions 61, 61 outside the second slit parts 27, 27. Then, the engaging stopper portions 61, 61 come out of the second slit parts 27, 27 and engage with the stop wall regions 37, 37 in a pull out direction namely so as to exert resistance to pull out motion. In this manner, the first wire retainer 5 is mounted on the first quick connector 1 so as embrace the retainer holding portion 15 with a pair of the engagement arms 49, 49, while the stopper portions 57, 57 engage with the raised mounting portions 21, 21 in an inserting direction namely so as to exert resistance to inserting motion and the engaging stopper portions 61, 61 engage with the raised mounting portions 21, 21 in a pull out direction. A pair of the engagement arms 49, 49 seat in the engagement slits 23, 23 so as to project largely in the first connector housing 3.

Meanwhile, a distance between one circumferential ends of the fist slit parts 25, 25 is designed equal to a distance between the other circumferential ends of the second slit parts 27, 27, and generally equal to an outer diameter of the pipe 63. Therefore, the first wire retainer 5 is mounted on the retainer mounting portion 15 while a pair of the engagement arms 49, 49, more specifically, a pair of the arm bodies 59, 59 do not spread apart but extend parallel with one another.

Figure 4:
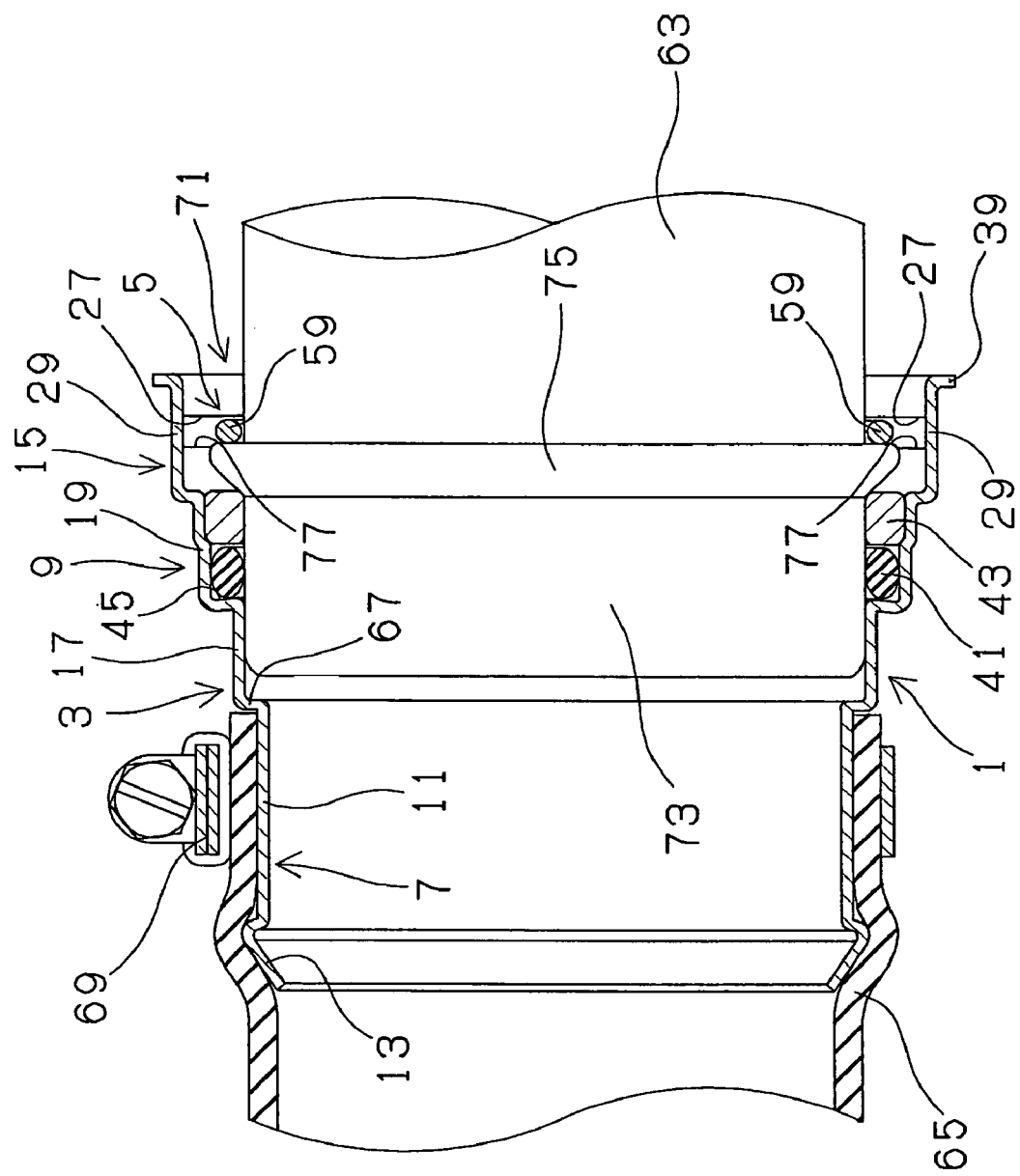
FIG. 4 is a sectional view taken in an axial direction, showing the first quick connector to which a rubber hose and a pipe are connected respectively.

As specifically shown in FIG. 4, a rubber hose 65 is fitted on an outer periphery of the hose connecting portion 7 so that a leading end or an opposite axial end of the hose 65 comes close to stepped portion 67 formed in the pipe retaining portion 17 on one axial end thereof, and is fixed to the connecting body 11 by a tightening band 69, and thereby is connected to the first quick connector 1 sufficiently in locking relation with respect thereto.

The pipe 63, for example, made of metal, is inserted into an opening 71 on an end of the retainer mounting portion 15 of the first quick connector 1 and fitted thereto. The pipe 63 has an inserting end portion 73 on one axial end thereof wherein an annular engagement projection 75 is formed on an outer peripheral surface. Here, the annular engagement projection 75 is formed so as to have an annular surface on one axial end diametrically enlarging in an opposite axial direction in a reverse tapered shape. The pipe 63 is pushed, fittingly inserted into the first quick connector 1 or the first connector housing 3 so that the annular surface of one axial end of the annular engagement projection 75 relatively progresses while expanding a gap between the arm bodies 59, 59 of the first wire retainer 5 and then abuts an opposite axial end of the first bush 43, and the inserting end portion 73 is received for entire length thereof in the pipe inserting portion 9 of the first connector housing 3. An annular surface of an opposite axial end of the annular engagement projection 75 is formed so as to expand radially or in a direction perpendicular to an axis, and is located in a position axially corresponding to or generally corresponding to one axial end 77 of the engagement slit 23 when the annular surface of the one axial end of the annular engagement projection 75 abuts an opposite axial end of the first bush 43. Therefore, as the pipe 63 is correctly inserted in the pipe inserting portion 9 of the first connector housing 3, spring-back force allows the arm bodies 59, 59 of the first wire retainer 5 to snappily return to an original parallel relation and snap-engage with the annular engagement projection 75 or the annular surface of the opposite axial end of the annular engagement projection 75 so as to lock the pipe 63 against relative axial movement out of the first quick connector 1.

One axial end of the inserting end portion 73 of the pipe 63 reaches in the pipe retaining portion 17 beyond or through the O-ring 41 and thereby a seal is formed by the O-ring 41 between the pipe 63 or the inserting end portion 73 of the pipe 63 and the first quick connector 1 or the first connector housing 3. One end of the inserting end portion 73 extending axially of the annular engagement projection 75 is retained by the pipe retaining portion 17 and the first bush 43 without radial play. In order to ensure snap-engagement of the annular engagement projection 75 of the pipe 63 with the engagement arms 49, 49 or the arm bodies 59, 59, the annular engagement projection 73 may be configured such that the annular surface of the opposite axial end of the annular engagement projection 73 is located slightly beyond the one axial end 77 of the engagement slit 23 in one axial direction when the annular surface of the one axial end thereof abuts the first bush 43.

Figure 6:
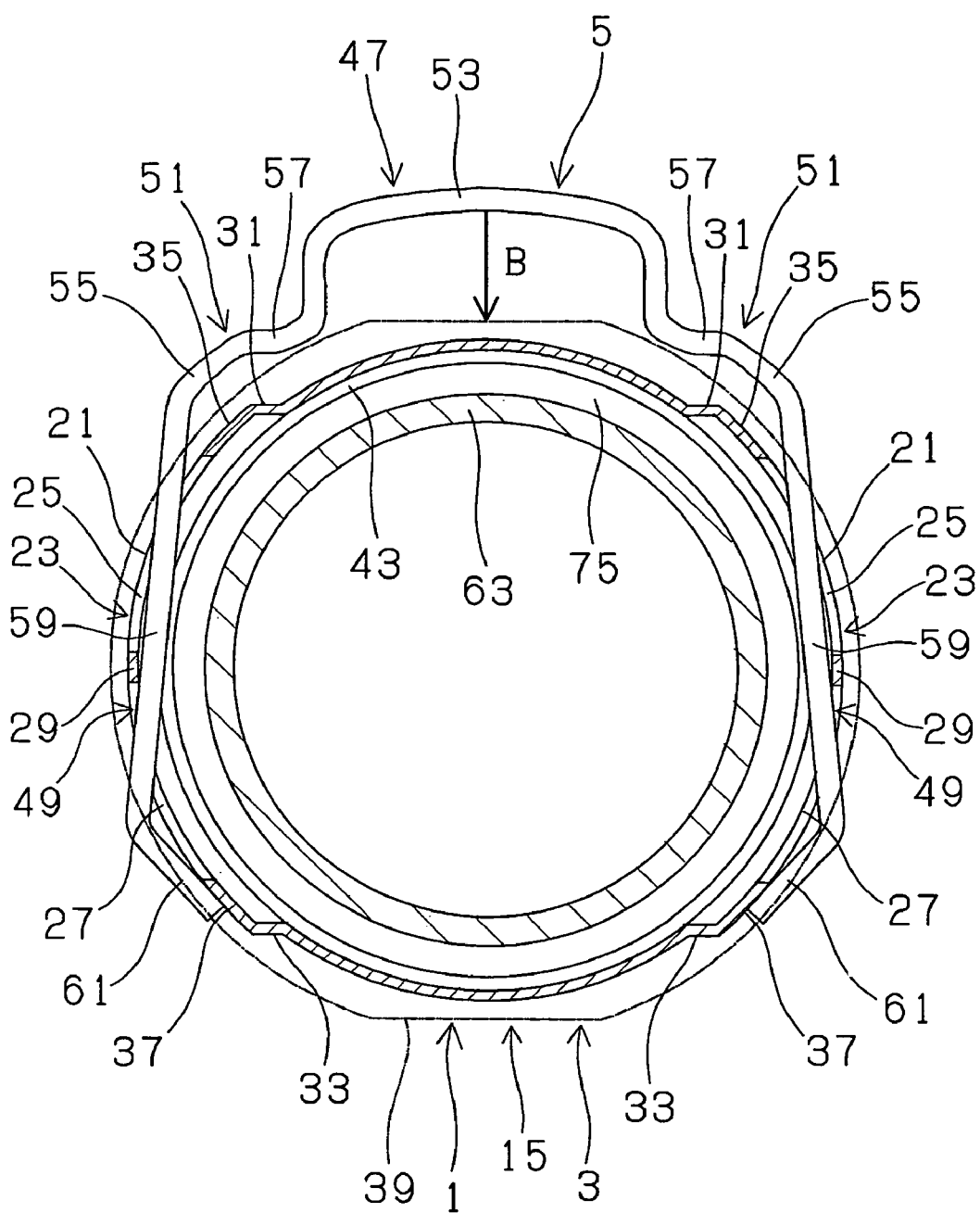
FIG. 6 is a view to explain an operating manner of a first wire retainer with respect to the first quick connector.

In the event of removing the pipe 63 from the first quick connector 1, pull-force or retracting force (refer to an arrow A in FIG. 5) is exerted to the fingerhold portion 53 of the first wire retainer 5 which is locked or retained in a mounted position (position shown in FIG. 5) in a pull-out direction or retracting direction (namely opposite to a mounting direction), for example, by lifting the fingerhold portion 53 with fingers. Then, as shown in FIG. 6, the first wire retainer 5 moves in a retracting direction while sliding the engaging stopper portions 61, 61 of the engagement arms 49, 49 toward the second slit parts 27, 27 over an outer surface of the stop wall regions 37, 37 of the other circumferential end of the raised mounting portions 21, 21, respectively. As the stop wall region 37 of the other circumferential end of the raised mounting portion 21 is formed of arcuate shape (like arch rising outwardly) in cross-section gradually expanding radially outwardly in a retracting direction, the engagement arms 49, 49 are gradually widened or spread apart along with movement of the first wire retainer 5 in a retracting direction, and thereby resistant force against retracting or retracting-resistant force is exerted to the first wire retainer 5. The first wire retainer 5 is further pulled against the retracting-resistant force until the arm bodies 59, 59 abut firmly against the divider portions 29, 29 about when the leading ends of the engaging stopper portions 61, 61 just pass through circumferential or longitudinal center of the stop wall regions 37, 37 on the other circumferential end. Then the first wire retainer 5 is not allowed to move yet further in the retracting direction beyond that position (retracted position). However, in this state, namely in a retracted state (as shown in FIG. 6), the engagement arms 49, 49 spread apart to such an extent as to permit the annular engagement projection 75 of the pipe 63 to pass through therebetween. So, engagement of the engagement arms 49, 49 with the annular engagement projection 75 of the pipe 63 is released, and thereby the pipe 63 can be pulled out of the first connector housing 3 or the pipe inserting portion 9.

And, when a retracting force is released from the fingerhold portion 53 of the first wire retainer 5, for example, by taking fingers off the fingerhold portion 53, the first wire retainer 5 moves or returns automatically and snappingly to the mounted position under spring back force of the engagement arms 49, 49 to their original parallel relation, while sliding the engaging stopper portions 61, 61 of the engagement arms 49, 49 over outer surfaces or outer peripheral surfaces of the stop wall regions 37, 37 on the other circumferential end of the raised mounting portions 21, 21 respectively in a direction opposite to the second slit parts 27, 27 (refer to an arrow B in FIG. 6).

Meanwhile, in the first wire retainer 5, opposite ends of the fingerhold portion 53 of horseshoe shape extends generally in the mounting direction, and the fingerhold portion 53 is formed with the stopper portions 57, 57 on leading ends thereof or leading ends of opposite ends thereof. When the first wire retainer 5 is located in the mounted position, the stopper portions 57, 57 are in abutment relation with the first end walls 31, 31 (locking parts, of which surfaces define locking surfaces) of the raised mounting portions 21, 21. Further, the abutment relation between the stopper portion 57 and the first end wall 31 is established on or between portions thereof perpendicular to or generally perpendicular to the mounting direction of the first wire retainer 5. Therefore, even if the fingerhold portion 53 of the first wire retainer 5 is tried to be pushed forcibly in the mounting direction or an external force is exerted on the fingerhold portion 53 in the mounting direction, the engagement arms 49, 49 of the first wire retainer 5 are not allowed to spread apart. However, for example, if the shoulders 51, 51 do not include the stopper portions 57, 57 and, for example, portions from the opposite ends of the fingerhold portion 53 to the shoulder bodies 55, 55 rise slightly from the first end walls 31, 31 of the raised mounting portions 21, 21, respectively, for example, when a pressure acts on a center of the fingerhold portion 53, rising portions are deformed toward the connector housing 3 and the engagement arms 49, 49 spread apart by acting as lever on fulcrums which are contact parts between the shoulder bodies 55, 55 and the stop wall regions 35, 35 of the raised mounting portions 21, 21. Then, there is a fear that engagement between the engagement arms 49, 49 and the annular engagement projection 75 of the pipe 65 is released and the pipe 63 escapes the first quick connector 1.

The retainer mounting portion 15 of the first connector housing 3 is formed in diametrically symmetrical shape so as to allow the first wire retainer 5 to be mounted also from a diametrically opposite side thereof similarly.

Figure 7:
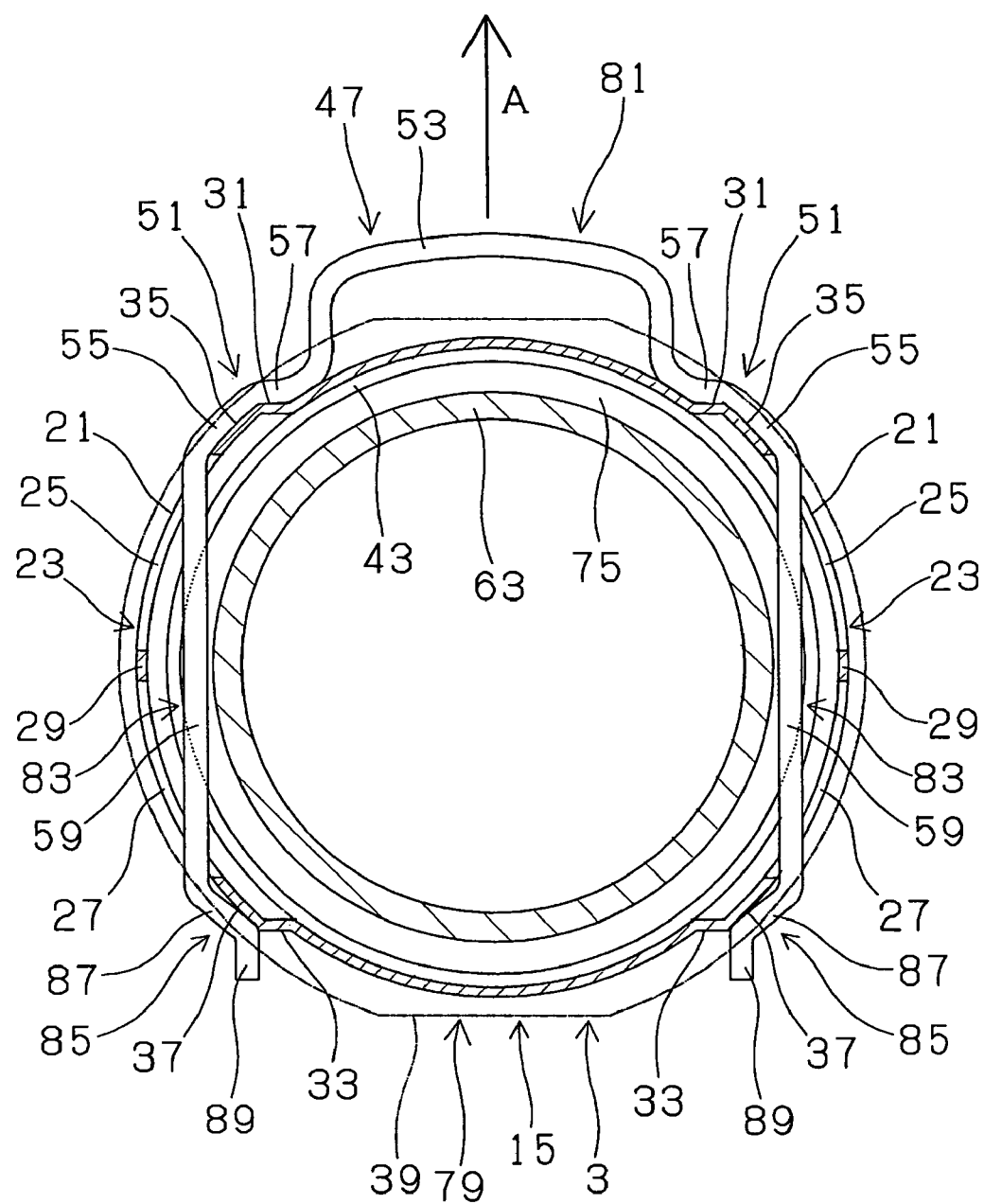
FIG. 7 is a sectional view taken in a radial direction, showing a second quick connector according to the present invention, to which the pipe is connected.

As shown in FIG. 7, for a second quick connector 79, a second wire retainer 81 is applied instead of the first wire retainer 5 for the first quick connector 1. With regard to other configuration, the second quick connector 79 is the same as the first quick connector 1. The second wire retainer 81 is configured by modifying the configuration of the engaging stopper portions 61, 61 of the first wire retainer 5 and has the same configuration as the first wire retainer 5 with regard to the other portions. Therefore, generally, the portions identical to the first quick connector 1 in terms of configuration and function are referred to with identical numeral references, and explanations thereon are omitted herein (this also applies to other embodiments given below).

The second wire retainer 81 has a pair of engagement arms 83, 83. Each of the engagement arms 83, 83 includes arm body 59 and engaging stopper portion 85 which is formed integrally on a leading end of the arm body 59 so as to bend inwardly. The engaging stopper portion 85 is different from the engaging stopper portion 61, includes an engaging body 87 which is angled so as to correspond to the stop wall region 37 of the other circumferential end of the raised mounting portion 21 and is formed with a generally equal length to the stop wall region 37, and a retaining portion 89 which is formed integrally on a leading end of the engaging body 87 so as to bend outwardly and extends short in the mounting direction or an extending direction of the arm body 59. The second wire retainer 81 is mounted on the first connector housing 3 such that the engaging bodies 87, 87 of the engaging stopper portions 85, 85 contact along or so as to follow outer surfaces of the stop wall regions 37, 37 on the other circumferential end and engage with the stop wall regions 37, 37. In some cases, curve start parts of the retaining portions 89, 89 contact, engage with or slide over the stop wall regions 37, 37.

Figure 8:
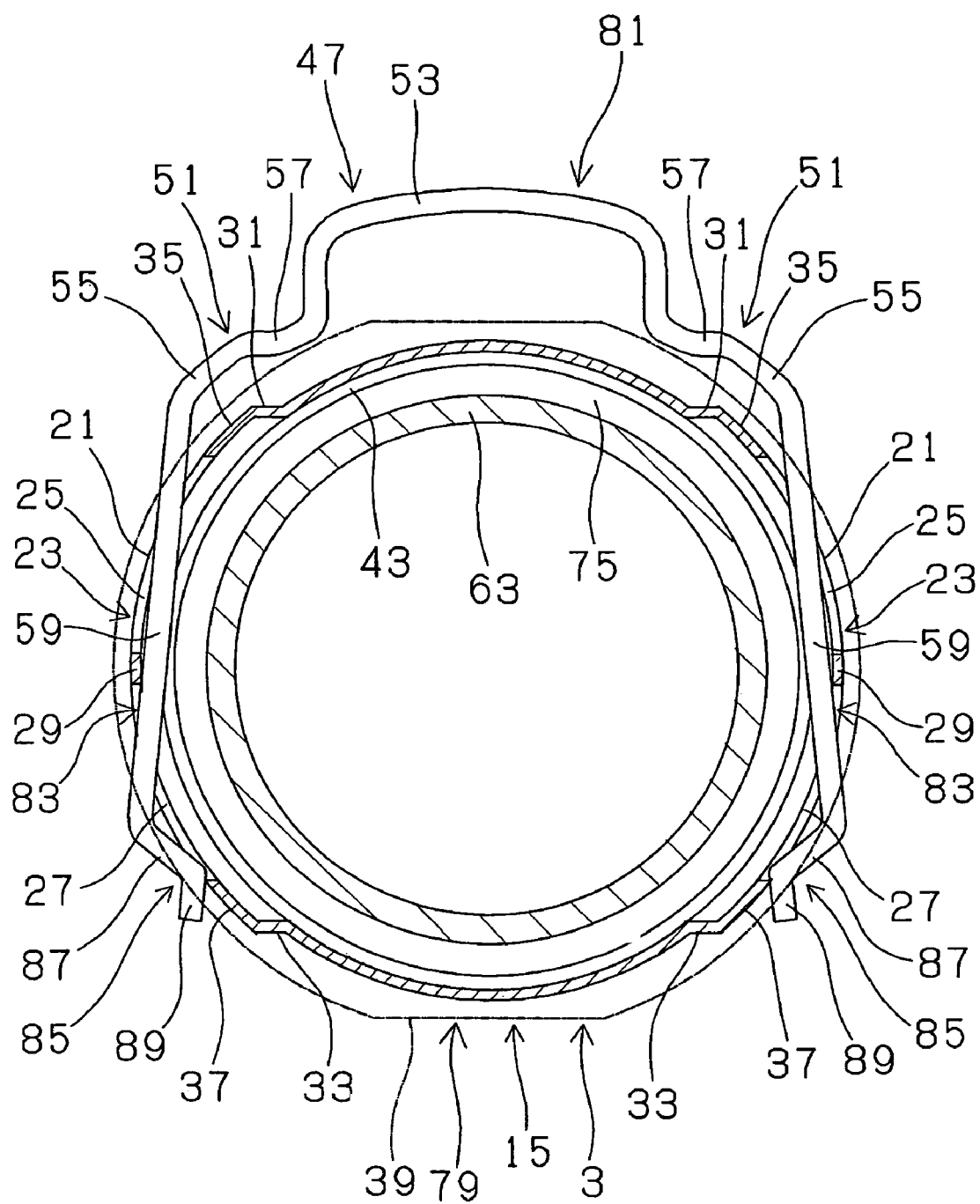
FIG. 8 is a view to explain an operating manner of a second wire retainer with respect to the second quick connector.

The second wire retainer 81 is mounted on the first connector housing 3 in the same manner and the same mode as the first wire retainer 5 (here, the engaging stopper portion 85 or the engaging body 87 are handled similarly to the engaging stopper portion 61) and then the second quick connector 79 is assembled. And, the pipe 63 is inserted in and connected to the second quick connector 79 in the same manner and the same mode as the first quick connector 1. In the event of removing the pipe 63 connected thereto from the second quick connector 79, as in the case of the first wire retainer 5, pull-force or retracting force (refer to an arrow A in FIG. 7) is exerted to the second wire retainer 81 which is retained in the mounted position (position shown in FIG. 7). Then, the second wire retainer 81 moves in a retracting direction while sliding the engaging bodies 87, 87 of the engagement arms 83, 83 toward the second slit parts 27, 27 over the outer surfaces of the stop wall regions 37, 37 of the other circumferential end of the raised mounting portions 21, 21. Just like in the first wire retainer 5, the engagement arms 83, 83 are gradually spreading apart along with movement of the second wire retainer 81 in the retracting direction. The second wire retainer 81 is pulled until the arm bodies 59, 59 abut firmly against the divider portions 29, 29, and is not allowed to move further in the retracting direction beyond that position, namely in a retracted position (position as shown in FIG. 8). However, in this state, namely in a retracting state, as in the first wire retainer 5, the engagement arms 83, 83 spread apart to such an extent as to permit the annular engagement projection 75 of the pipe 63 to pass through therebetween.

As well shown in FIG. 8, in this retracting state, the leading ends of the engaging bodies 87, 87 of the engaging stopper portions 85, 85 are out of the stop wall regions 37, 37 and are slipped into or about to be slipped into the second slit parts 27, 27 respectively, and the retaining portions 89, 89 of the engaging stopper portions 85, 85 are engaged with the other circumferential ends of the second slit parts 27, 27 in a mounting direction respectively. So, even when the retracting force is released from the second wire retainer 81, the second wire retainer 81 is still maintained in the retracted position. In order to return the second wire retainer 81 from the retracting state to the mounted position, the retaining portions 89, 89 are moved outwardly, and the leading ends of the engaging bodies 87, 87 of the engaging stopper portions 85, 85 are forced out of the second slit parts 27, 27 onto the outer surfaces of the stop wall regions 37, 37 by pushing forcibly the second wire retainer 81 in a mounting direction. Then, the second wire retainer 81 smoothly moves or returns to the mounted position with assistance of spring back force of the engagement arms 83, 83 to their original parallel relation.

Figure 9:
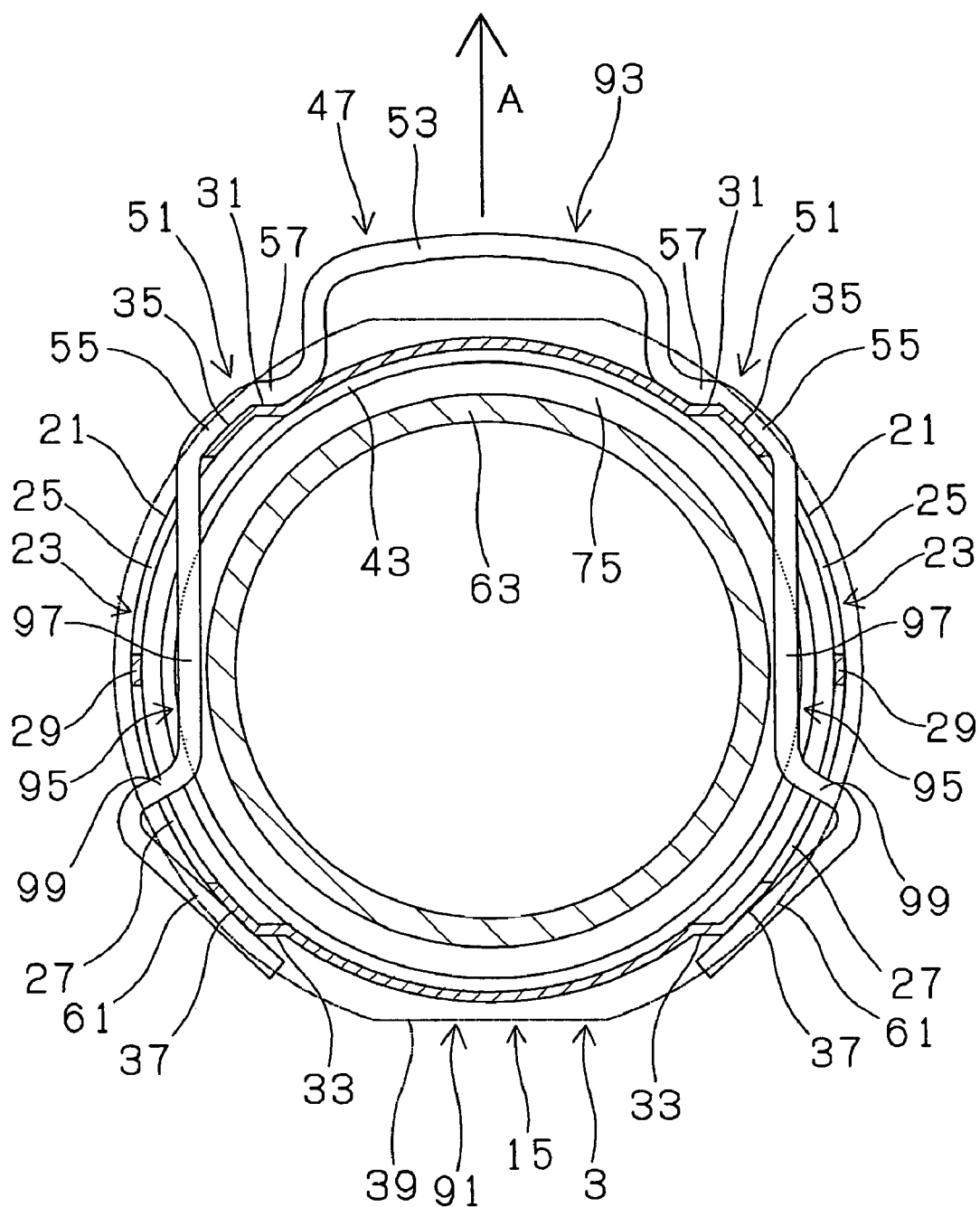
FIG. 9 is a sectional view taken in a radial direction, showing a third quick connector according to the present invention, to which the pipe is connected.

As shown in FIG. 9, for a third quick connector 91 a third wire retainer 93 is applied instead of the first wire retainer 5 for the first quick connector 1. With regard to other configuration, the third quick connector 91 is the same as the first quick connector 1. The third wire retainer 93 is configured by modifying the configuration of leading ends of the arm bodies 59, 59 of the first wire retainer 5 and has the same configuration as the first wire retainer 5 with regard to other portions.

The third wire retainer 93 has a pair of engagement arms 95, 95. Just like in the first wire retainer 5, each of the engagement arms 95, 95 includes a long arm body 97 extending straight from a leading end of the shoulder 51 or the shoulder body 55 and an engaging stopper portion 61 which is formed on a leading end of the arm body 97 so as to be curved, bent or angled inwardly. However, the arm body 97 includes an abutment stopper portion 99 which is bent outwardly and projects like triangle shape on a leading end thereof The abutment stopper portion 99 has one portion toward the shoulder 51 which is bent and projects outwardly, for example, relatively at a steep angle, and another portion toward the leading end which is bent inwardly, for example, relatively at a gentle angle. The another portion toward the leading end extends like straight line and the engaging stopper portion 61 is defined so as to extend the another portion like straight line.

Figure 10:
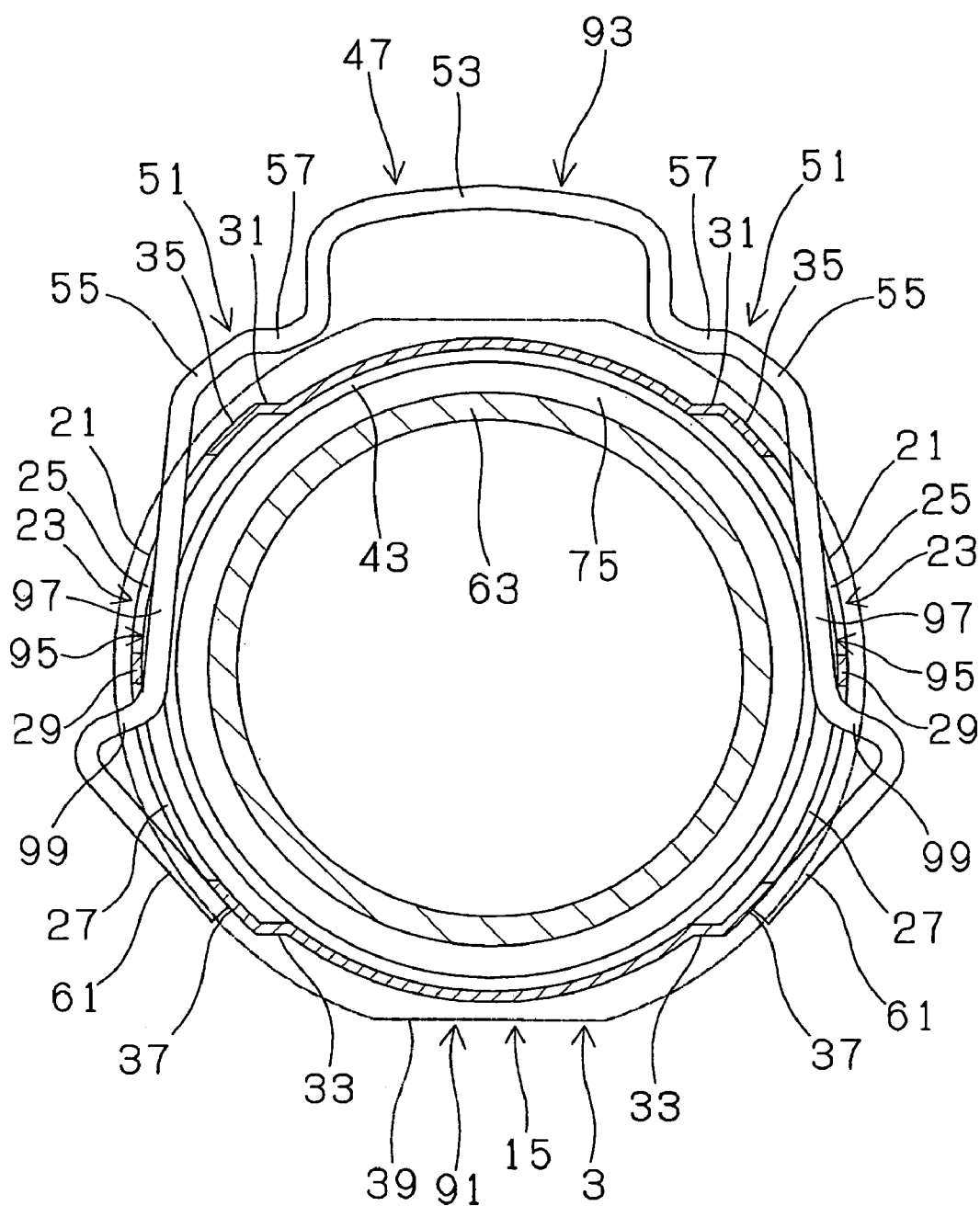
FIG. 10 is a view to explain an operating manner of a third wire retainer with respect to the third quick connector.

The third wire retainer 93 is mounted on the first connector housing 3 in the same manner and the same mode as the first wire retainer 5 and thus the third quick connector 91 is assembled. In third wire retainer 93, the engaging stopper portion 61, for example, may be formed slightly shorter in length in order to facilitate smooth mounting of the third wire retainer 93. And, the pipe 63 is inserted in and connected to the third quick connector 91 in the same manner and the same mode as in the first quick connector 1. In the event of removing the pipe 63 connected thereto from the third quick connector 91, as in the case of the first wire retainer 5, pull-force or retracting force (refer to an arrow A in FIG. 9) is exerted to the third wire retainer 93 which is retained in the mounted position (position shown in FIG. 9). Then, the third wire retainer 93 moves in a retracting direction in the same mode as the first wire retainer 5. And, about when the leading end of the engaging stopper portion 61 reaches a circumferential center or a longitudinal center of the stop wall region 37 on the other circumferential end, a foot portion of the abutment stopper portion 99 of the arm body 97 abuts the divider portion 29, and then the third wire retainer 93 is not allowed to move further in the retracting direction beyond that position, namely a retracted position (as shown in FIG. 10). However, in this state, namely in a retracting state, as in the first wire retainer 5, the engagement arms 95, 95 spread apart to such an extent as to permit the annular engagement projection 75 of the pipe 63 to pass through therebetween.

Figure 11:
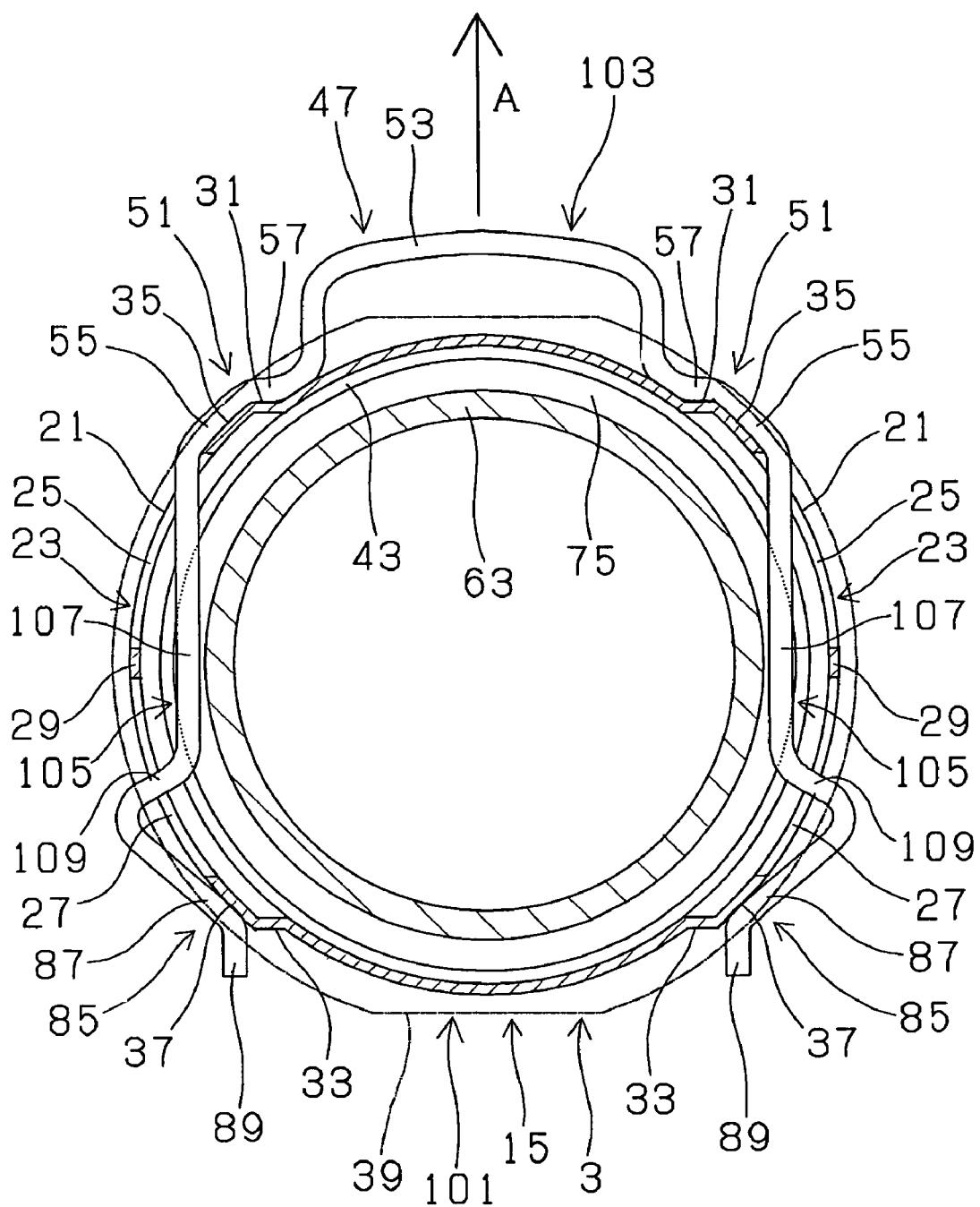
FIG. 11 is a sectional view taken in a radial direction, showing a fourth quick connector according to the present invention, to which the pipe is connected.

As shown in FIG. 11, for a forth quick connector 101 a fourth wire retainer 103 is applied instead of the second wire retainer 81 for the second quick connector 79. With regard to other configuration the fourth quick connector 101 is the same as the second quick connector 79. The fourth wire retainer 103 is configured by modifying the configuration of leading ends of the arm bodies 59, 59 of the second wire retainer 81 and has the same configuration as the second wire retainer 81 with regard to other portions.

The forth wire retainer 103 has a pair of engagement arms 105, 105. Just like the second wire retainer 81 or the first wire retainer 5, each of the engagement arms 105, 105 includes a long arm body 107 extending straight from a leading end of the shoulder 51 or the shoulder body 55, and an engaging stopper portion 85 which is formed on a leading end of the arm body 107 so as to be curved, bent or angled inwardly. The arm body 107 includes an abutment stopper portion 109 toward a leading end which is bent outwardly and projects like triangle shape. The abutment stopper portion 109 has one portion toward the shoulder 51 which is bent and projects outwardly, for example, relatively at a steep angle, and another portion toward a leading end which is bent inwardly, for example, relatively at a gentle angle. The another portion toward the leading end extends like straight line and the engaging stopper portion 85 is defined continuously from the another portion.

Figure 12A:
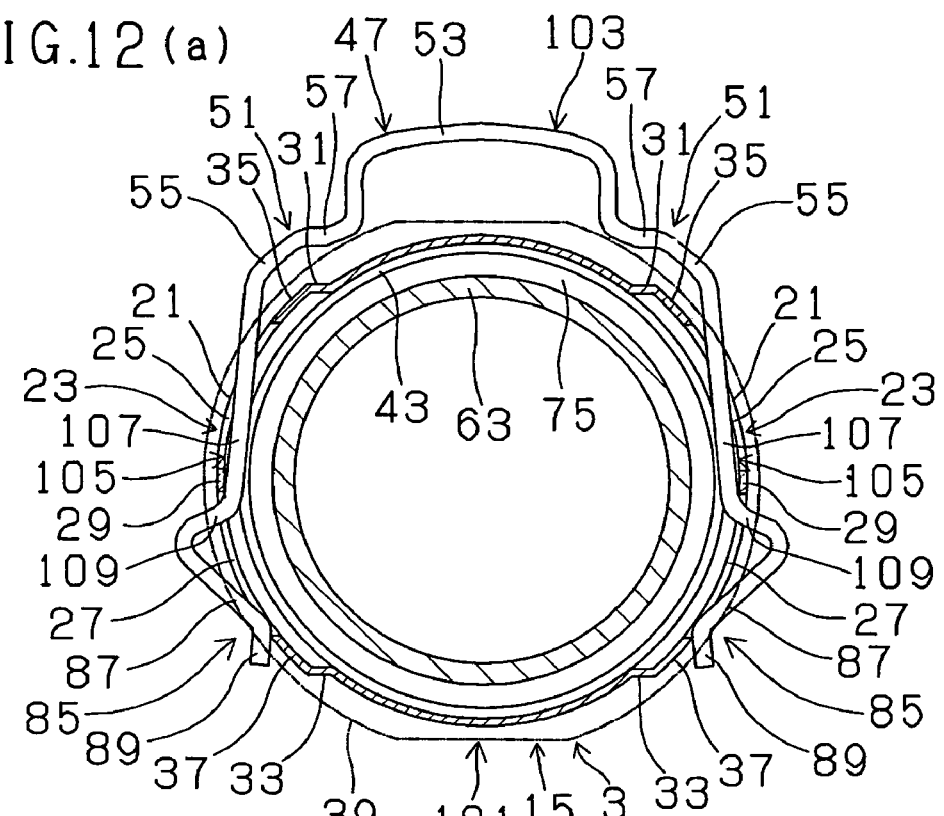
FIG. 12(*a*) is a view to explain an operating manner of a fourth wire retainer with respect to the fourth quick connector, and showing a state that the fourth wire retainer has moved in a retracted position.

The forth wire retainer 103 is mounted on the first connector housing 3 in the same manner and the same mode as the second wire retainer 81 and then the forth quick connector 101 is assembled. And, the pipe 63 is inserted in and connected to the fourth quick connector 101 in the same manner and the same mode as the second quick connector 79. In the event of removing the pipe 63 connected thereto from the fourth quick connector 101, as in the case of the second wire retainer 81, pull-force or retracting force (refer to an arrow A in FIG. 11) is exerted to the forth wire retainer 103 which is retained in the mounted position (as shown in FIG. 11). Then, the fourth wire retainer 103 moves in a retracting direction in the same mode as the second wire retainer 81, a foot portion of the abutment stopper portion 109 of the arm body 107 abuts the divider portion 29, and the fourth wire retainer 103 is not allowed to move further in the retracting direction beyond that position, namely a retracted position (the position as shown in FIG. 12*a*). However, in this state, namely in a retracting state, as in the second wire retainer 81, the engagement arms 105, 105 spread apart to such an extent as to permit the annular engagement projection 75 of the pipe 63 to pass through therebetween.

In this retracting state, the leading ends of the engaging bodies 87, 87 of the engaging stopper portions 85, 85 are out of the stop wall regions 37, 37 on the other circumferential end and are slipped into or about to be slipped into the second slit parts 27, 27. So, when the retracting force is released from the fourth wire retainer 103, the fourth wire retainer 103 is still maintained in the retracted position, just like the second wire retainer 81. In order to return the forth wire retainer 103 from the retracting state to the mounted position, it is necessary to push strongly the fourth wire retainer 103 in a mounting direction, just like the second wire retainer 81.

Figure 12B:
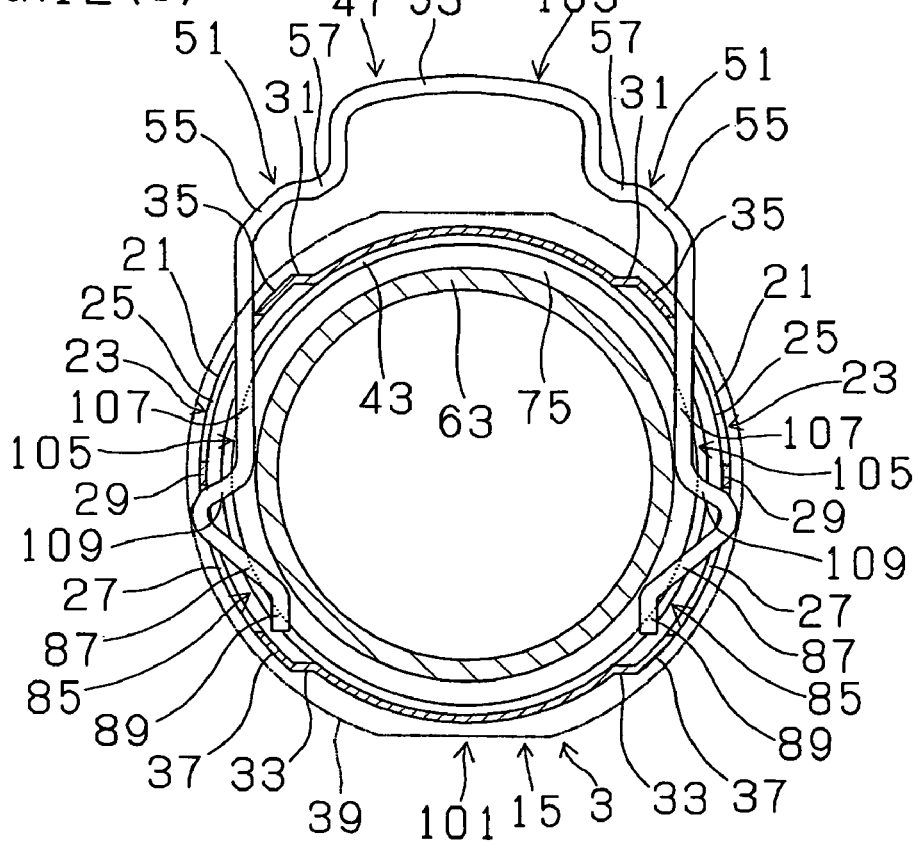

The engaging stopper portions 85, 85 may be slipped in the second slit parts 27, 27 entirely by pulling the forth wire retainer 103 too forcibly as shown in FIG. 12*b*. However, the abutment stopper portion 109 is not allowed to pass through a narrow gap between the pipe 63 and the divider portion 29. So, even if the forth wire retainer 103 is pulled forcibly, the forth wire retainer 103 cannot be removed out of the first connector housing 3.

Figure 13:
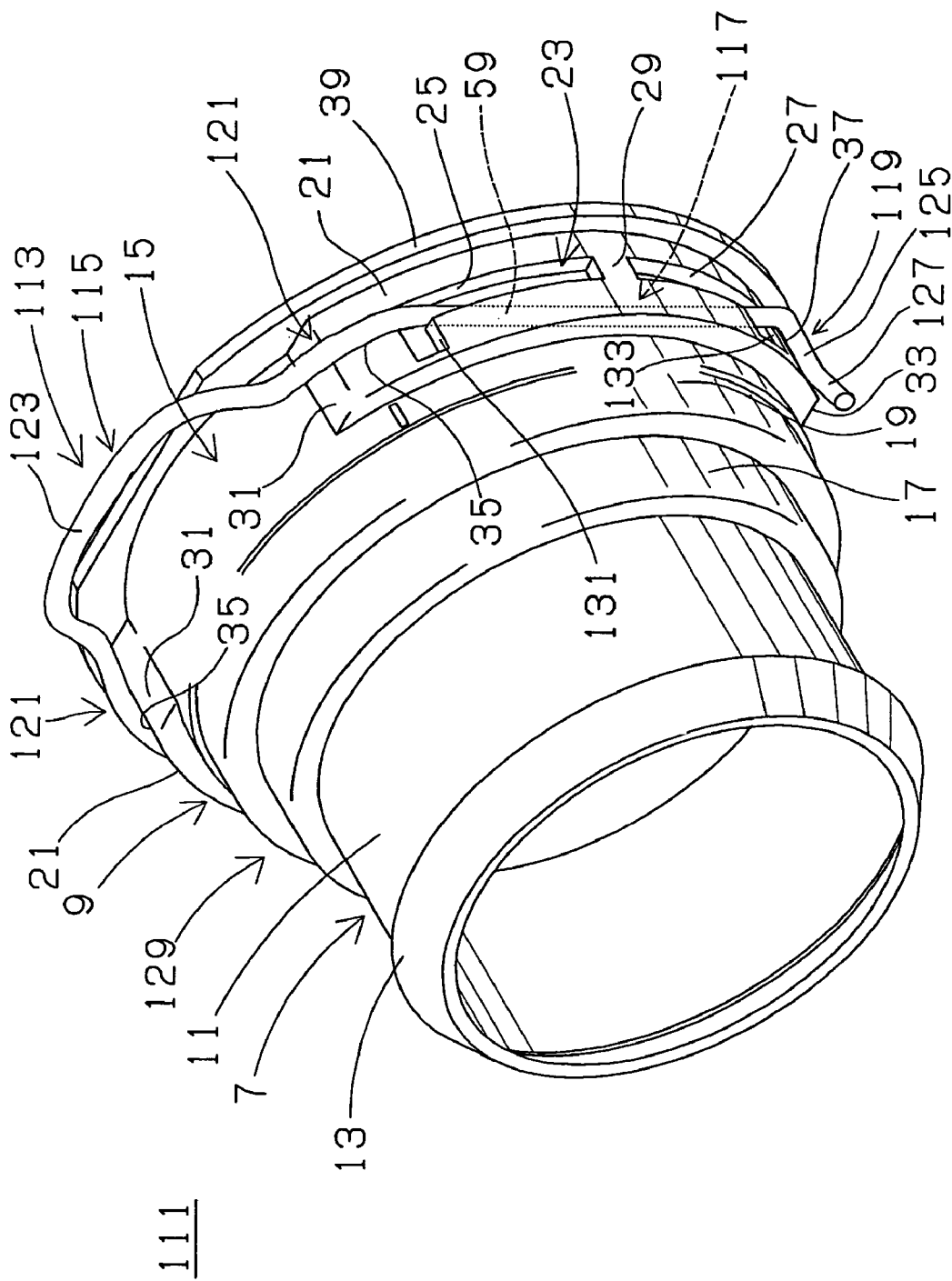
FIG. 13 is a perspective view of a fifth quick connector according to the present invention.

As shown in FIG. 13, for a fifth quick connector 111 a fifth wire retainer 113 is adapted instead of the second wire retainer 81 for the second quick connector 79. The fifth wire retainer 113 is, for example, made of metal wire member. The fifth quick connector 111 is also configured by modifying configuration of the first connector housing 3 and the first bush 43 so as to correspond to the fifth wire retainer 113, and has the same configuration as the second quick connector 79 with regard to other configuration.

The fifth wire retainer 113 has a link portion 115 and a pair of engagement arms 117, 117 which extend from opposite ends of the link portion 115 in parallel relation to one another. Each of the engagement arm 117 includes an arm body 59 and an engaging stopper portion 119 which is formed integrally on a leading end of the arm body 59 so as to bend inwardly. The link portion 115 has shoulders 121, 121 on opposite ends thereof, and a fingerhold portion 123, which has generally the same configuration as the fingerhold portion 53 of the second wire retainer 81 between the shoulders 121, 121. Different from the shoulder 51 of the second wire retainer 81, the shoulder 121 is formed so as to extend like straight line, at such an angle as to correspond to the stop wall region 35, from the fingerhold portion 123 to the engagement arm 117. However, the link portion 115 of the fifth wire retainer 113 may be configured the same as the link portion 47 of the second wire retainer 81. Each of the engagement arms 117, 117 includes the engaging stopper portion 119. The engaging stopper portion 119 includes an engaging body 125 curved, bent or angled inwardly which is configured generally the same as the engaging body 87 of the second wire retainer 81 and an axial portion 127 which is formed integrally on a leading end of the engaging body 125, so as to be bent and extend in one axial direction (generally in one axial direction), the engaging body 125 is formed angularly so as to correspond to the stop wall region 37 of the other circumferential end of the raised mounting portion 21 and has generally equal length to the stop wall region 37. The fifth wire retainer 113 is mounted on the second connector housing 129 such that the engaging bodies 125, 125 of the engaging stopper portions 119, 119 contact along or so as to follow outer surfaces of the stop wall regions 37, 37 of the other circumferential end and engage with the stop wall portions 37, 37, respectively. The fifth wire retainer 113 is the same as the second wire retainer 81 with regard to other configuration. In some cases, curve start parts of the axial portions 127, 127 contact, engage with or slide over the stop wall regions 37, 37.

The second connector housing 129 of the fifth quick connector 111 is formed with a first opening (incoming opening) 131 shaped in slit or rectangular shape extending short in one axial direction in one circumferential end portion of the first slit part 25 continuously from the one circumferential end portion thereof and also a second opening (outgoing opening) 133 shaped in slit or rectangular shape extending short in one axial direction in the other circumferential end of the second slit part 27 continuously from the other circumferential end thereof. The second connector housing 129 has the same configuration as the first connector housing 3 with regard to other portions.

Figure 14:
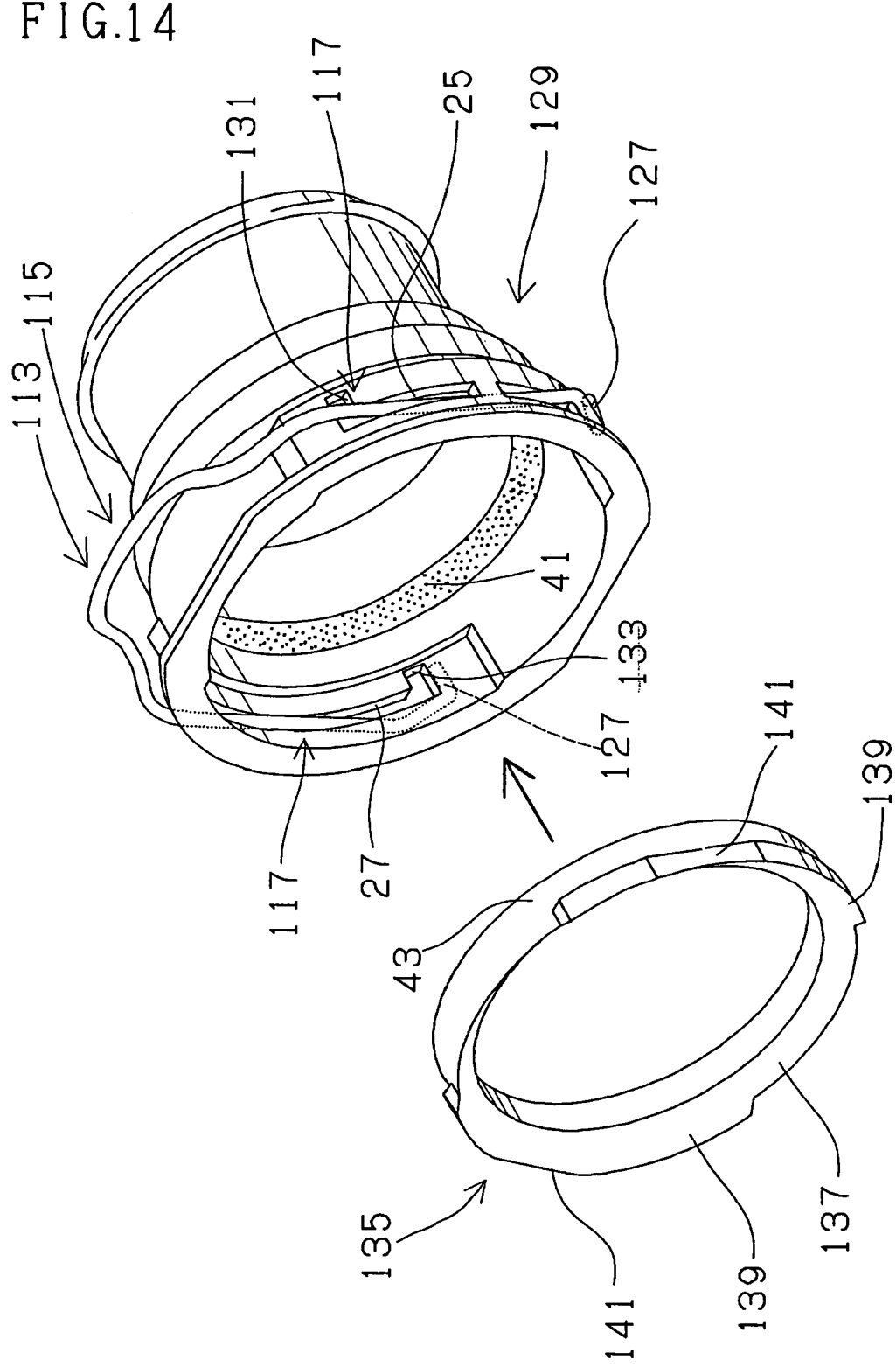
FIG. 14 is an exploded perspective view of the fifth quick connector.
Figure 15:
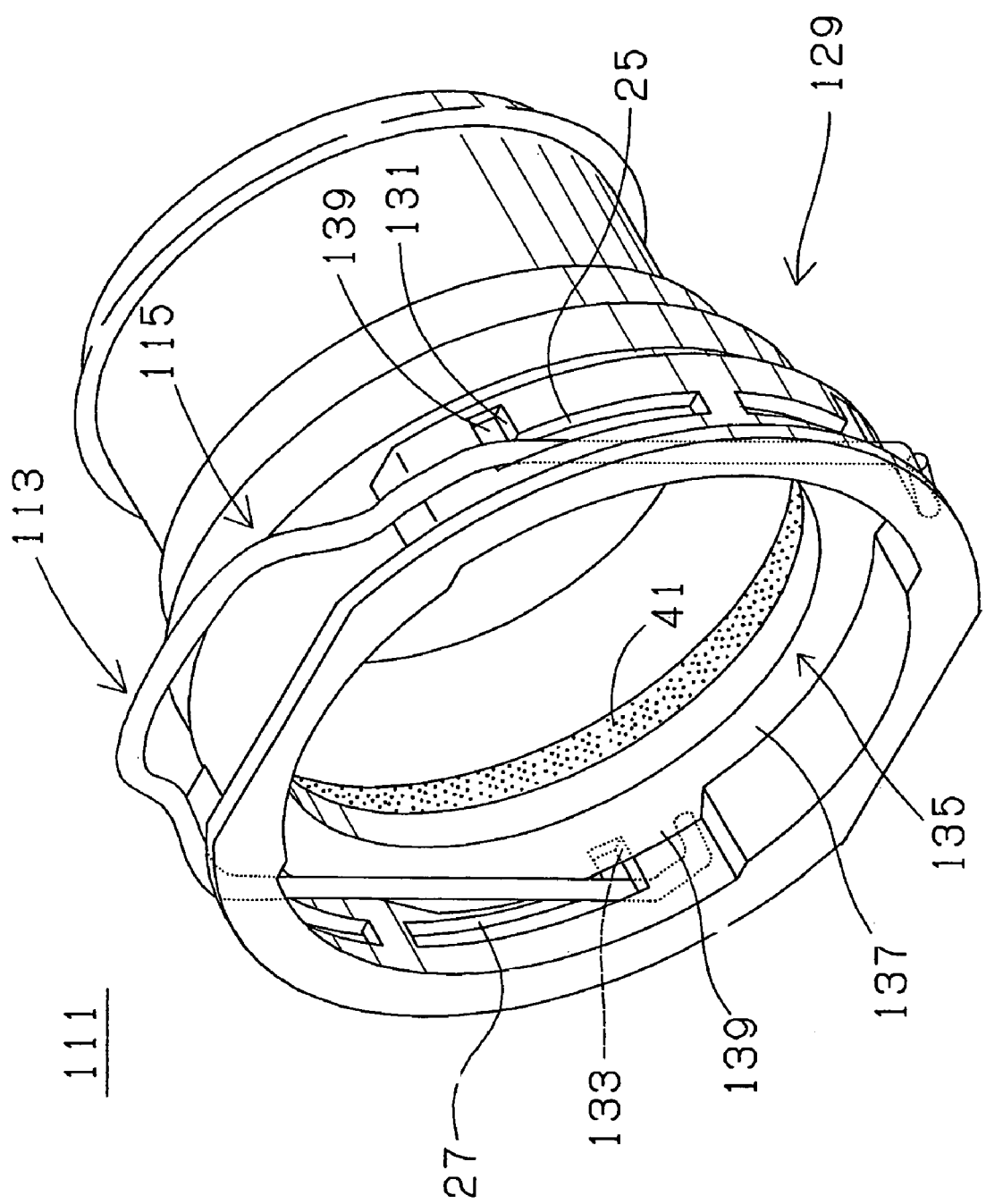
FIG. 15 is another perspective view of the fifth quick connector.

As well shown in FIG. 14, a second bush 135, for example, made of metal, is adapted in the fifth quick connector 111. The second bush 135 is configured by modifying the first bush 43, namely, forming a receptacle portion 137 for receiving the annular engagement projection 75 of the pipe 63, integrally on an opposite axial end of the first bush 43. The receptacle portion 137 includes an inner peripheral surface which expands diametrically in an opposite axial direction in reverse tapered manner so as to correspond to a tapered annular surface of one axial end of the annular engagement projection 75. The second bush 135 further integrally includes block regions 139, 139 projecting slightly in an opposite axial direction in diametrically symmetrical positions of the receptacle portion 137. Each of the block regions 139, 139 has a circumferential length corresponding to the raised mounting portion 21, and includes an inner surface so as to be extended from the inner peripheral surface of the receptacle portion 137. An outer peripheral surface of the second bush 135 is formed so as to conform in shape to a part of an inner peripheral surface of the second connector housing 129 which corresponds to the outer peripheral surface of the second bush 135. However, circumferential mid portions of the block regions 139, 139 to seat in the raised mounting portions 21, 21 are cut away to define passing-through parts 141, 141, respectively. So, the first opening 131 of the fist slit part 25 and the second opening 133 of the second slit part 27 are to be, entirely or partly, blocked or closed, by outer peripheral surfaces or outer surfaces of the block regions 139, 139 which are in contact relation with inner peripheral surfaces or inner surfaces of the raised mounting portions 21, 21, respectively, when the second bush 135 is fitted in the second connector housing 129. Therefore, in the fifth quick connector 111, as far as the second bush 135 is not removed from the second connector housing 129, the fifth wire retainer 113 never escapes from the second connector housing 129.

Figure 17:
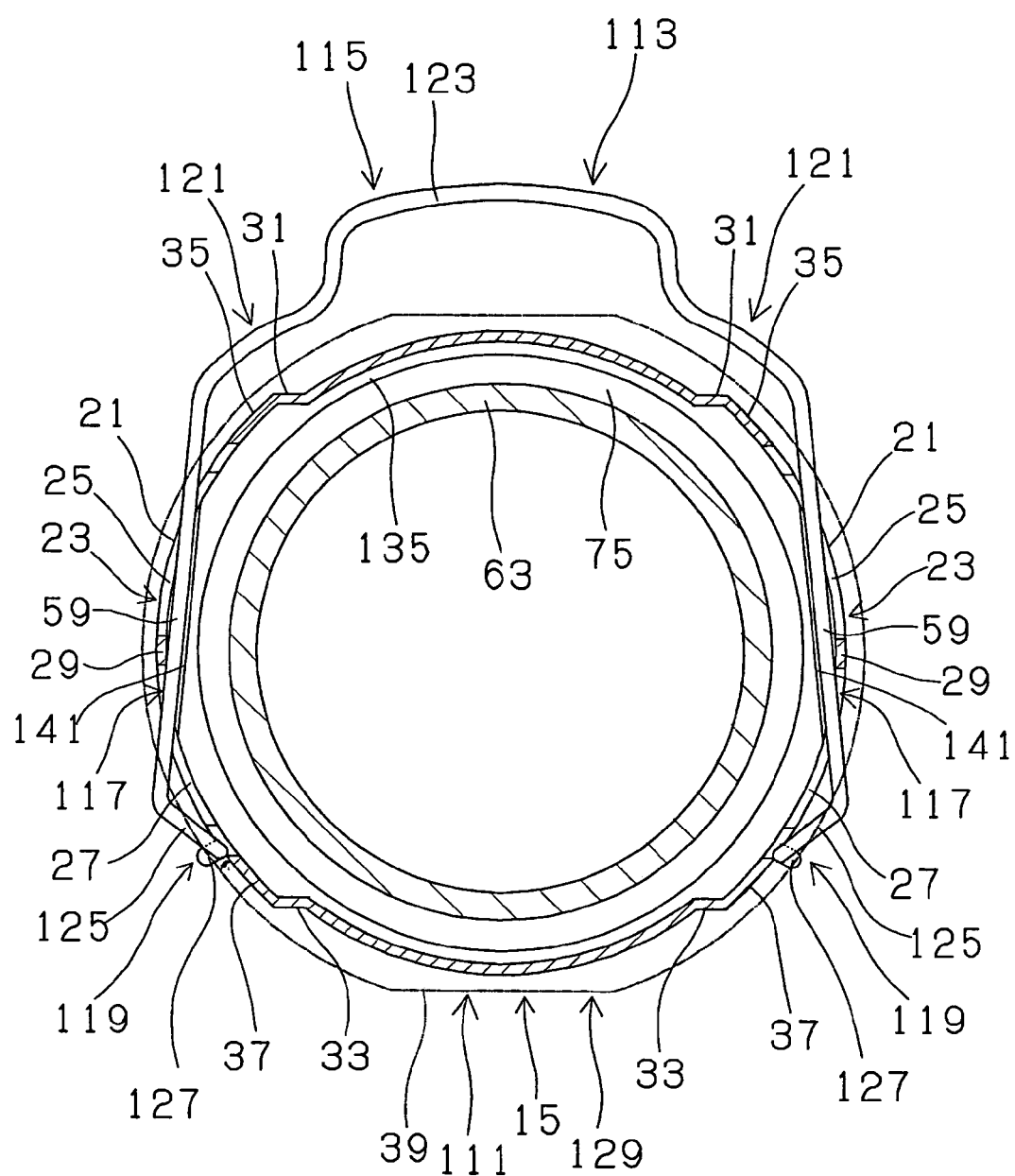
FIG. 17 is a view to explain an operating manner of a fifth wire retainer with respect to the fifth quick connector.

In order to assemble the fifth quick connector 111 with such configuration, first, the fifth wire retainer 113 is mounted on the second connector housing 129 from a side of the first slit part 25 (a predetermined radial side) in the following manner. The axial portions 127, 127 of the engaging stopper portions 119, 119 are inserted in the first openings 131, 131 of the first slit parts 25, 25 of the second connector housing 129, and then the axial portions 127, 127 are projected out of the second openings 133, 133 of the second slit parts 27, 27 outwardly, respectively. The fifth wire retainer 113 is mounted on the second connector housing 129 in a similar manner and a similar mode to the second wire retainer 81. Then, the fifth wire retainer 113 is pulled in a retracting direction until just before the axial portions 127, 127 seat in the second openings 133, 133, respectively, and is held in this state (in a state as shown in FIG. 14), then the second bush 135 is force-fitted in the second connector housing 129. In this state (refer to FIG. 17 showing a spreading-apart state of the fifth wire retainer 113 generally identical to FIG. 14), a distance between the arm bodies 59, 59 or portions of the arm bodies 59, 59 extending or projecting inside the second connector housing 129 is generally equal to or slightly longer than a distance between the passing-through parts 141, 141 of the second bush 135. That is, the engagement arms 117, 117 or the arm bodies 59, 59 spread apart sufficiently to allow the second bush 135 to pass through therebetween or to allow the passing-through portions 141, 141 and the portion of the first bush 43 of the second bush 135 to pass through therebetween (in general, the engagement arms 117, 117 or the arm bodies 59, 59 spread apart sufficiently not to allow the engagement arms 117, 117 to overlie or overlap on an outer rim or edge of a portion of the first bush 43). Therefore, the second bush 135 is allowed to pass through the fifth wire retainer 113 and to be force-fitted in the seal holding portion 19.

Figure 16:
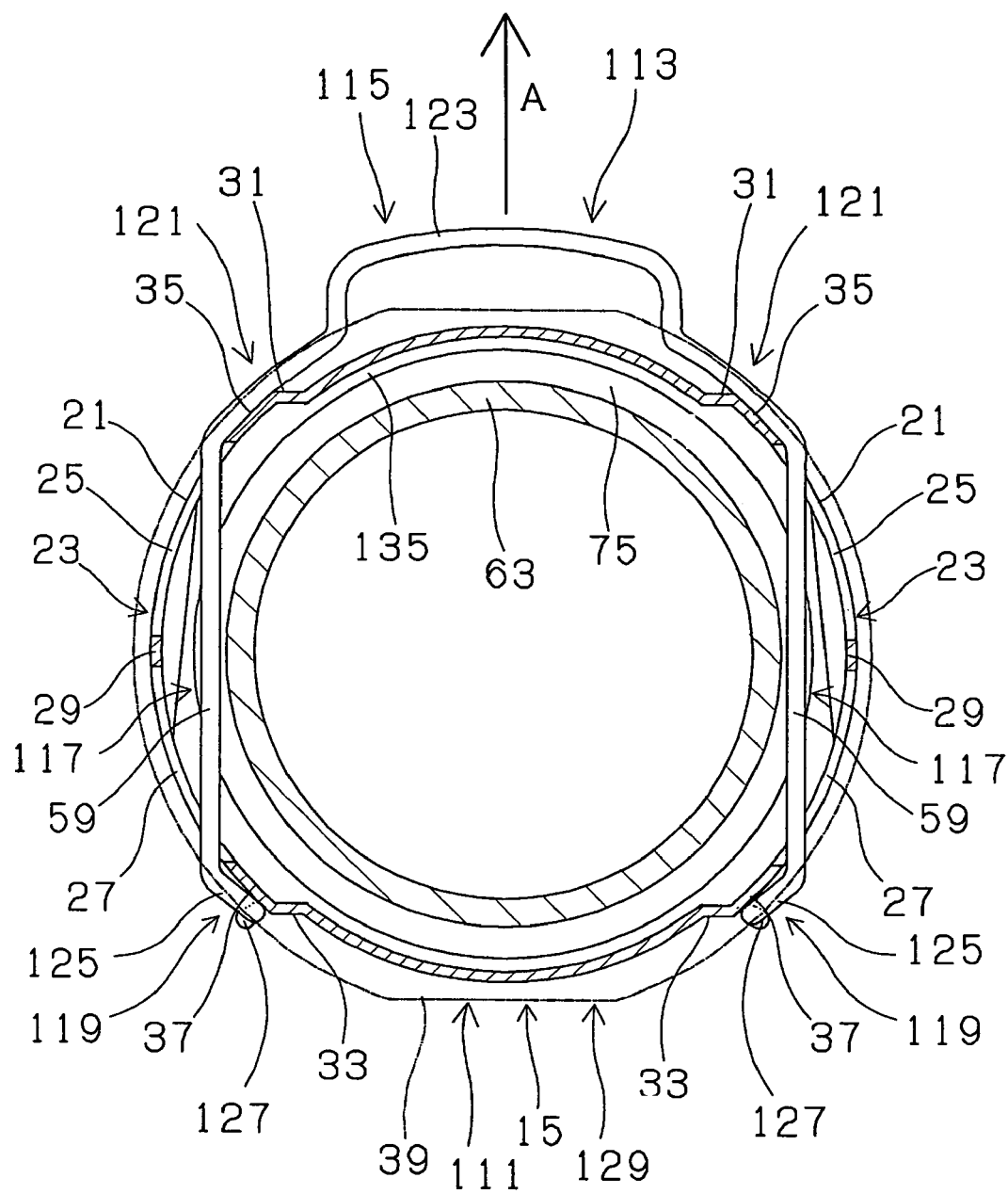
FIG. 16 is a sectional view taken in a radial direction, showing the fifth quick connector to which the pipe is connected.

With reference to FIG. 16, as stated above, the fifth wire retainer 113 is mounted on the second connector housing 129 such that the engaging bodies 125, 125 of the engaging stopper portions 119, 119 engage with the stop wall regions 37, 37 on the other circumferential.

The pipe 63 is inserted in and connected to the fifth quick connector 111 in the same manner and the same mode as the second quick connector 79. In the event of removing the pipe 63 connected thereto from the fifth quick connector 111, as in the case of the second wire retainer 81, pull-force or retracting force (refer to an arrow A in FIG. 16) is exerted to the fifth wire retainer 113 which is retained in the mounted position (position shown in FIG. 16). Then, the fifth wire retainer 113 moves in a retracting direction while sliding the engagement bodies 125, 125 of the engagement arms 117, 117 toward the second slit parts 27, 27 over the outer surfaces of the stop wall regions 37, 37 of the other circumferential end of the raised mounting portions 21, 21. Just like in the second wire retainer 81, engagement arms 117, 117 are gradually spreading apart along with movement of the fifth wire retainer 113 in a retracting direction. The fifth wire retainer 113 is pulled until the arm bodies 59, 59 abut firmly against the divider portions 29, 29, and is not allowed to move further in the retracting direction beyond that position, namely in a retracted position (position as shown in FIG. 17). However, in this state, namely in a retracting state, the engagement arms 117, 117 spread apart to such an extent as to permit the annular engagement projection 75 of the pipe 63 to pass through therebetween. Here, the axial portions 127, 127 are formed so as to rise slightly from outer surfaces of the stop wall regions 37, 37 of the opposite circumferential end of the raised mounting portions 21, 21 (more concretely, in some cases, only curve start parts of the axial portions 127, 127 contact, engage with or slide over the outer surfaces of the stopper wall regions). However, the axial portions 127, 127 may be formed such that entire axial portions 127, 127 slide over the outer surfaces of the stop wall regions 37, 37. Meanwhile, in the drawings with respect to the first wire retainer 5, the second wire retainer 81, the third wire retainer 93 and the forth wire retainer 103, the engagement arms 49, 83, 95 and 105 seem to overlap slightly on an outer rim or edge of the first bush 43 in the retracted position. Such configuration is possible, but of course the wire retainers 49, 83, 95 and 105 may be configured in such a manner that the engagement arms 49, 83, 95 and 105 do not overlap on the outer rim or edge of the first bush 43 in the retracted position similarly to the fifth wire retainer 113.

As well shown in FIG. 17, in this retracting state, leading ends of the engagement bodies 125, 125 of the engaging stopper portions 119, 119 are out of the stop wall regions 37, 37 and are slipped into or about to be slipped into the second slit parts 27, 27, respectively. As the second openings 133, 133 are blocked or closed by outer peripheral surfaces or outer surfaces of the blocking regions 139, 139 of the second bush 135, the axial portions 127, 127 do not enter the second connector housing 129. However, the axial portions 127, 127 (the curve start parts or sides of the curve start parts of the axial portions 127, 127) engage the other circumferential ends of the second slit parts 27, 27 and the second openings 133, 133 or the other circumferential ends of the second slit parts 27, 27 in a mounting direction respectively (the axial portions 127, 127 are angled, for example, toward one axial direction, outwardly,). So, even when the retracting force is released from the fifth wire retainer 113, the fifth wire retainer 113 is still maintained in the retracted position. In order to return the fifth wire retainer 113 from the retracting state or retracted position to the mounted position, the axial portions 127, 127 of the engaging stopper portions 119, 119 are forced out of the second slit parts 27, 27 and the second openings 133, 133 or the second slit parts 27, 27 onto or toward the outer surfaces of the stop wall regions 37, 37 or the axial portions 127, 127 are moved outwardly, and the leading ends of the engaging bodies 125, 125 of the engaging stopper portions 119, 119 are forced out of the second slits 27, 27 onto the outer surface of the stop wall regions 37, 37 by pushing forcibly the fifth wire retainer 113 in a mounting direction. Then, the fifth wire retainer 113 smoothly moves or returns to the mounted position with assistance of spring back force of the engagement arms 117, 117 to their original parallel relation.

A quick connector according to the present invention, for example, which is to be adapted to extreme thermophilic air hose in piping of an automobile or the like, brings about a reliable connecting function.

We claim:

1. A quick connector for joining a pipe and a hose, comprising:
   a tubular connector housing provided with a connecting portion to be connected with a hose on one axial end thereof and a pair of engagement slits in diametrically opposed relation on an opposite axial end thereof,
   a wire retainer of horseshoe shape or generally horseshoe shape having a pair of engagement arms, and mounted to the connector housing on the opposite axial end thereof in such a manner that a pair of the engagement arms seat in the engagement slits so as to clip to the connector housing, the engagement arms being configured to project through the engagement slits into the connector housing and to snap-engage with an annular engagement projection formed on an inserting end portion of the pipe when the inserting end portion is inserted into the connector housing,
   wherein:
   each of the engagement slits has a width generally equal to or slightly larger than the diameter of the engagement arm of the wire retainer, and has a first slit part on one circumferential end and a second slit part on the other circumferential end, the first slit part and the second slit part are discontinued with a divider portion of a narrow circumferential length interposed therebetween, the pair of the engagement arms of the wire retainer pass inside the divider portions and through the engagement slits,
   the wire retainer is mounted to the connector housing movably between a mounted position and a retracted position,
   the pair of the engagement arms engage with the annular engagement projection of the pipe when the wire retainer is in the mounted position, and the engagement arms allow the annular engagement projection to pass through when the wire retainer is in the retracted position,
   the wire retainer is also moved from the mounted position to the retracted position by pulling the wire retainer in a pull out direction,
   leading ends of the engagement arms of the wire retainer are bent inwardly to contact an outer surface of the connector housing so as to follow the outer surface thereof, the engagement arms gradually spread apart with leading ends thereof sliding over the outer surface of the connector housing, respectively, by pulling the wire retainer in the pull out direction, and
   the engagement arms spread apart until the engagement arms abut against the divider portions and engage with the divider portions, and thereby movement of the wire retainer in the pull out direction is blocked when the wire retainer is pulled out to the retracted position.

2. The quick connector as set forth in claim 1, wherein the wire retainer engages with the circumferential end portions of the engagement slits, and is maintained in the retracted position when the wire retainer is moved in the retracted position.

3. A quick connector for joining a pipe and a hose, comprising:
   a tubular connector housing provided with a connecting portion to be connected with a hose on one axial end thereof and a pair of engagement slits in diametrically opposed relation on an opposite axial end thereof,
   a wire retainer of horseshoe shape or generally horseshoe shape having a pair of engagement arms, and mounted to the connector housing on the opposite axial end thereof in such a manner that a pair of the engagement arms seat in the engagement slits so as to clip the connector housing, the engagement arms being configured to project through the engagement slits into the connector housing and to snap-engage with an annular engagement projection formed on an inserting end portion of the pipe when the inserting end portion is inserted into the connector housing,
   wherein:
   each of the engagement slits is formed with width generally equal to or slightly larger than the diameter of the engagement arm of the wire retainer, and has a first slit part on one circumferential end and a second slit part on the other circumferential end, the first slit part and the second slit part are discontinued,
   each leading portion of the engagement arm is bent so as to extend in an axial direction of the quick connector to define an axial portion, and each of the first and the second slit parts of the tubular connector housing is formed with an opening which allows the axial portion to slip in and out of the connector housing, and
   the axial portions of the engagement arms are inserted in the connector housing through the openings of the first slit parts, and then the axial portions are projected out of connector housing through the openings of the second slit parts outwardly, respectively.

4. The quick connector as set forth in claim 3, wherein the opening is closed up by a bush fitted in the tubular connector housing after the wire retainer is mounted to the tubular connector housing.

5. The quick connector as set forth in claim 1, wherein the engagement arms have arm bodies extending straight along an entire length thereof, and the engagement arms spread apart until longitudinal middle portions of the arm bodies extending straight abut against the divider portions and engage with the divider portions, and thereby movement of the wire retainer in the pull out direction is blocked when the wire retainer is pulled out to the retracted position.

* * * * *